Jan. 8, 1963 E. A. THOMPSON 3,071,929
MECHANICO-HYDRAULIC POWER AND CONTROL UNIT
Filed Jan. 8, 1958 18 Sheets-Sheet 1
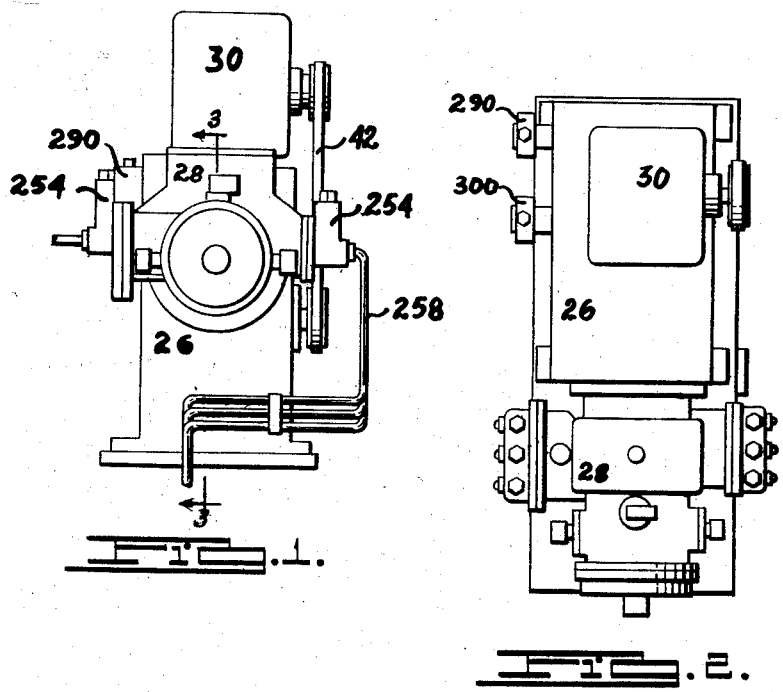
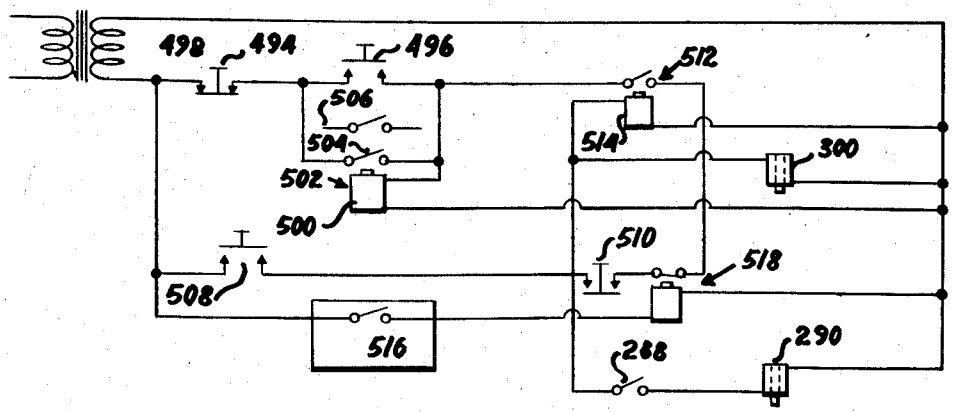
INVENTOR
EARL A THOMPSON
BY
*Ralph L. Tweedale*
ATTORNEY INVENTOR.
EARL A. THOMPSON
BY
Ralph L. Tweedale
ATTORNEY

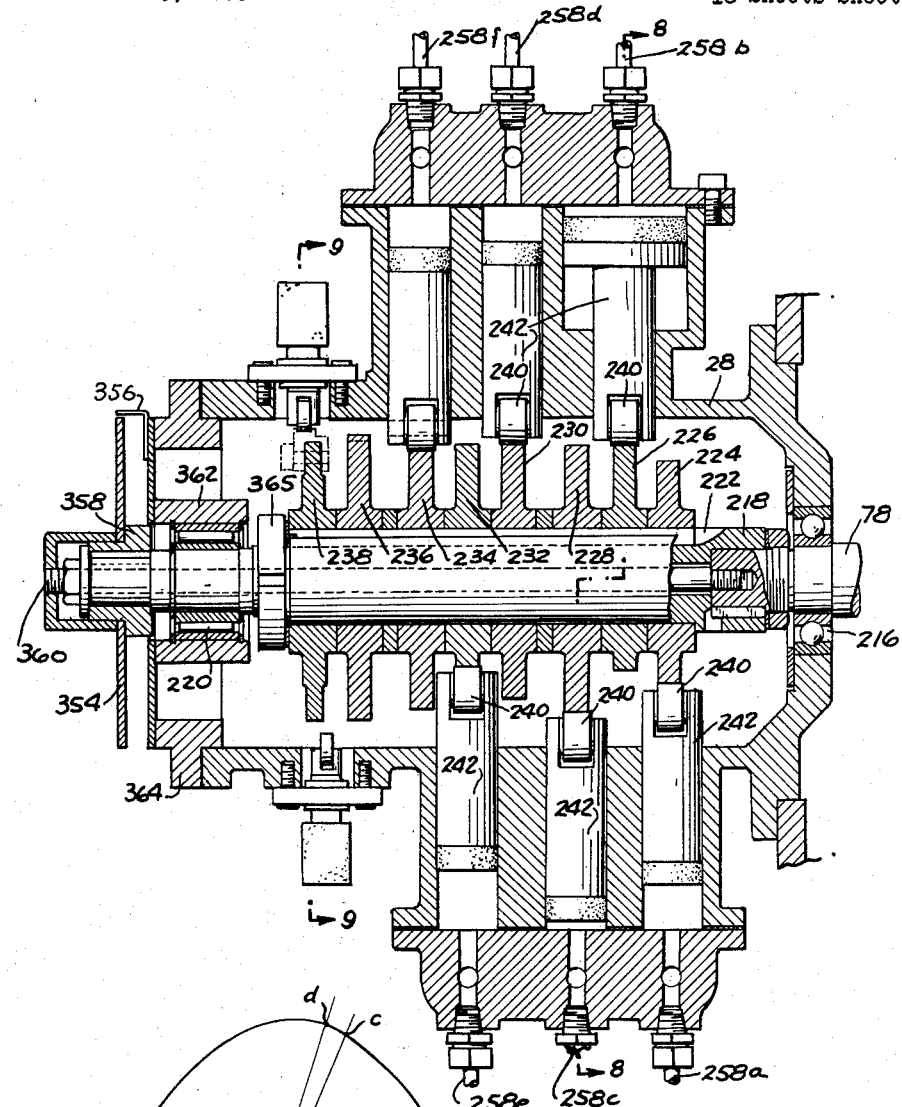
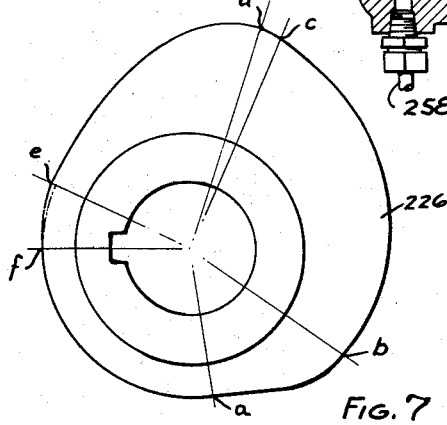
FIG. 6
FIG. 7
INVENTOR.
EARL A. THOMPSON
BY
Ralph L. Tweedale
ATTORNEY

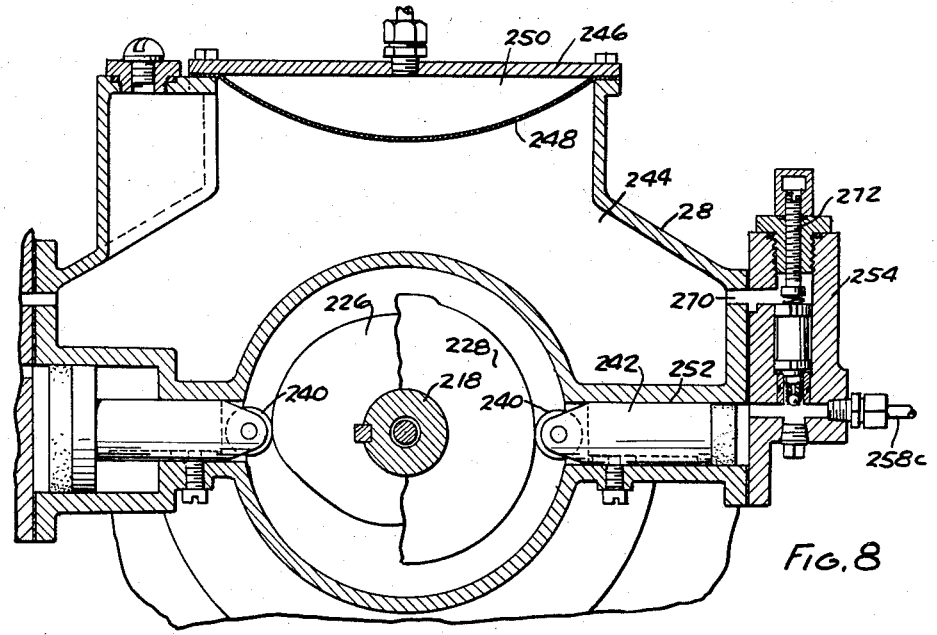
Fig. 8
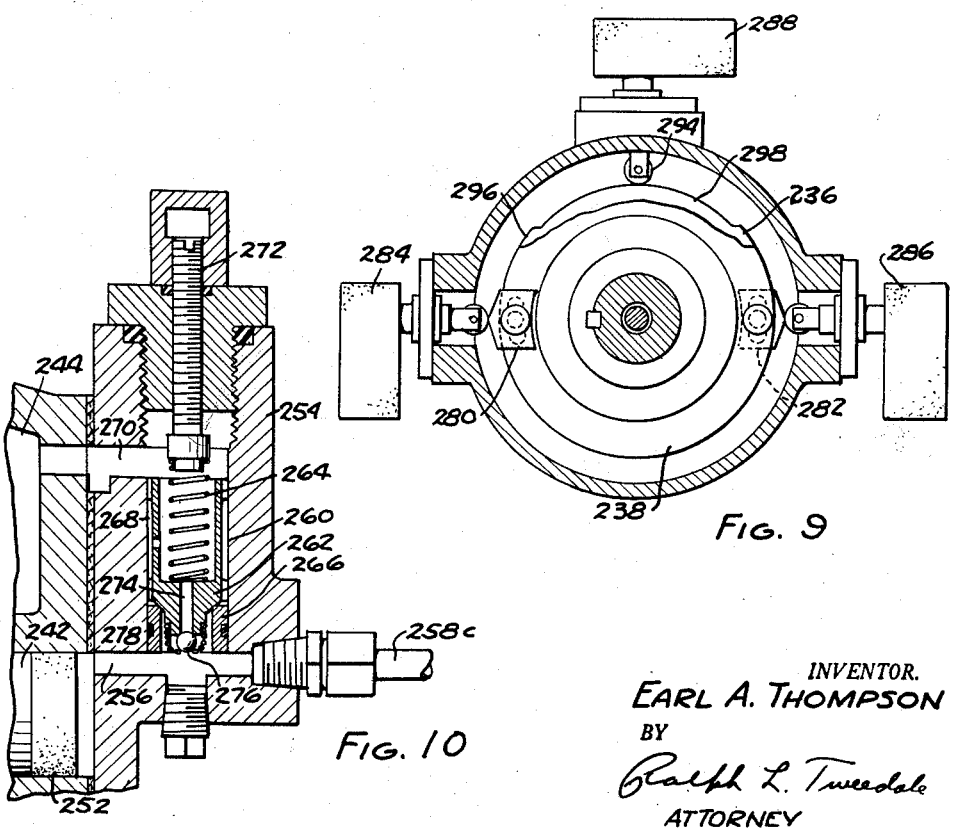
Fig. 9
Fig. 10
INVENTOR.
EARL A. THOMPSON
BY
Ralph L. Tweedale
ATTORNEY

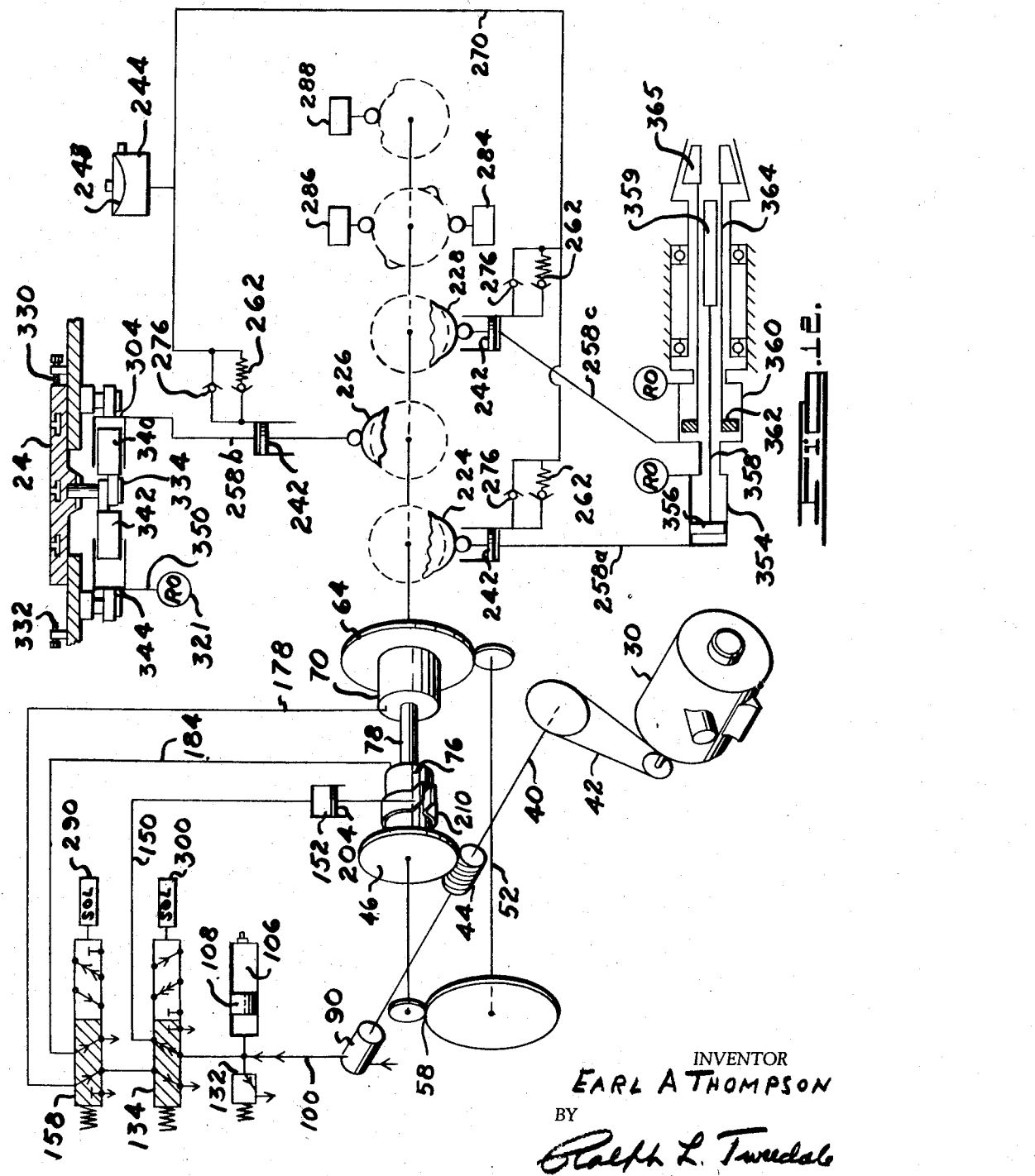

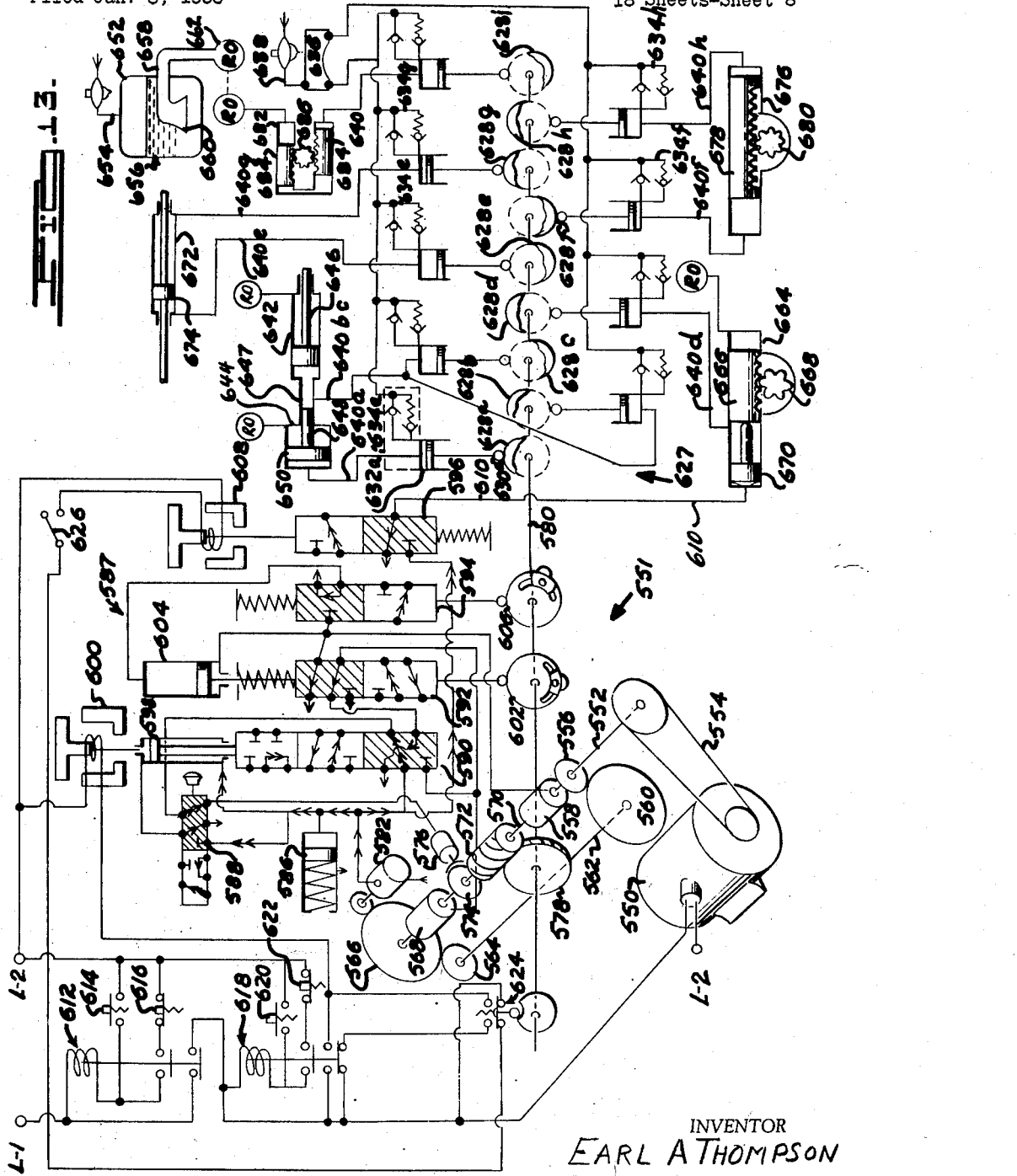
Jan. 8, 1963  E. A. THOMPSON  3,071,929
MECHANICO-HYDRAULIC POWER AND CONTROL UNIT
Filed Jan. 8, 1958  18 Sheets-Sheet 8
INVENTOR
EARL A THOMPSON
BY
Ralph L. Tweedale
ATTORNEY Jan. 8, 1963  E. A. THOMPSON  3,071,929
MECHANICO-HYDRAULIC POWER AND CONTROL UNIT
Filed Jan. 8, 1958  18 Sheets-Sheet 9

INVENTOR
EARL A THOMPSON
BY
Ralph L. Tweedale
ATTORNEY

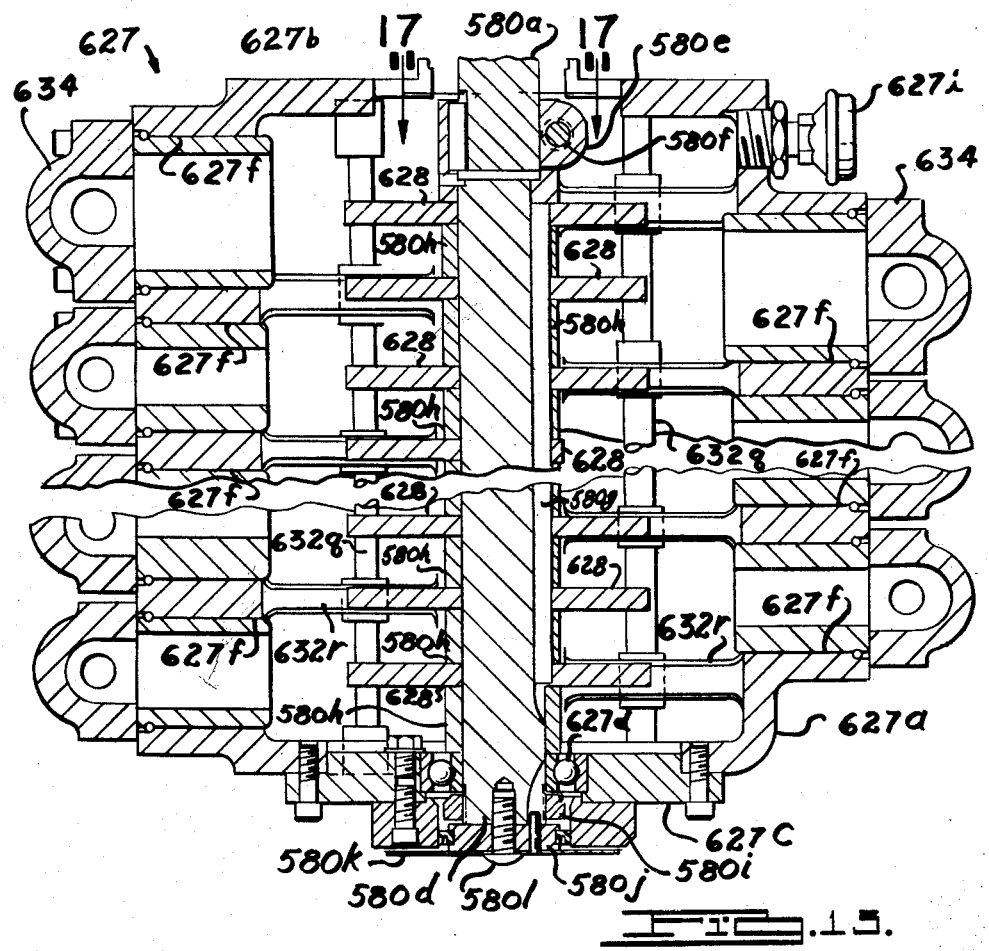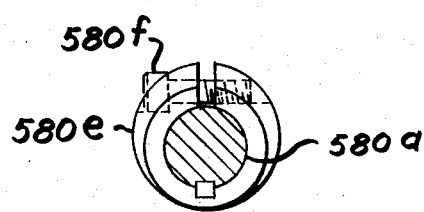

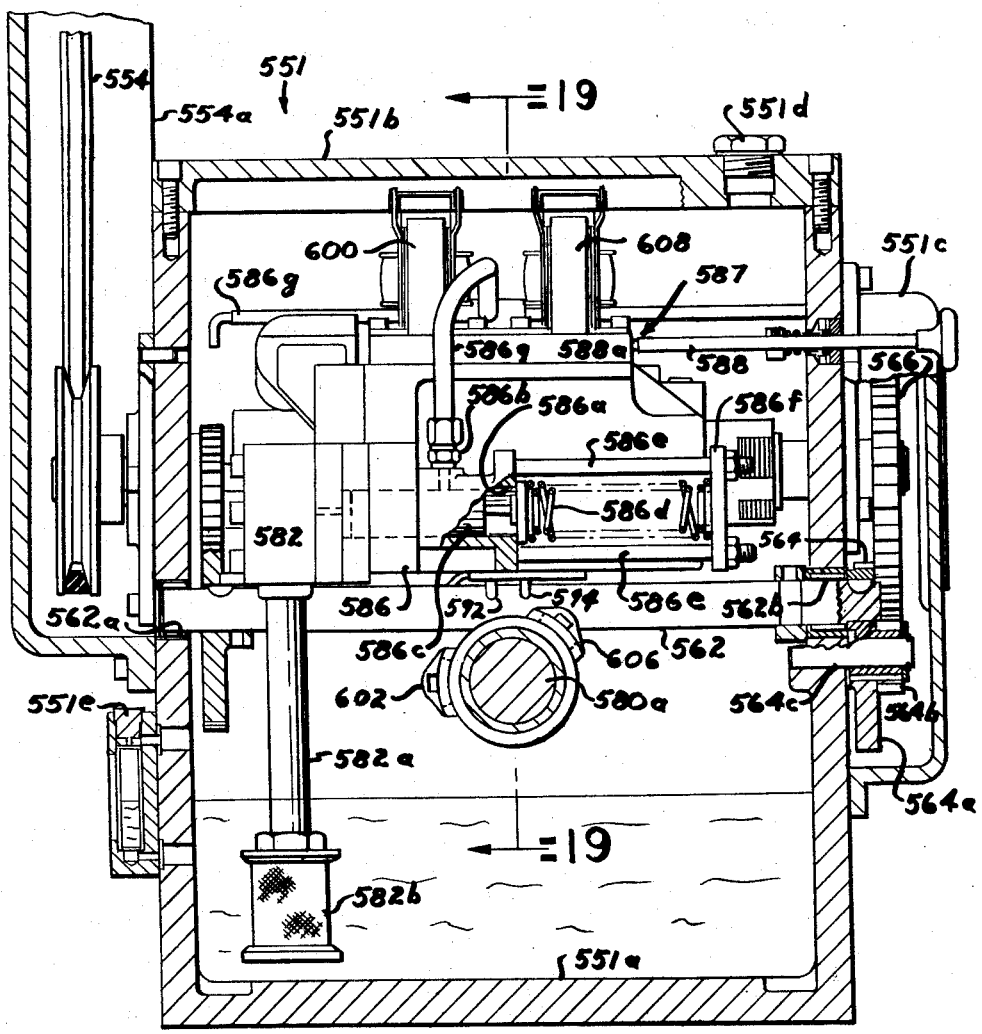

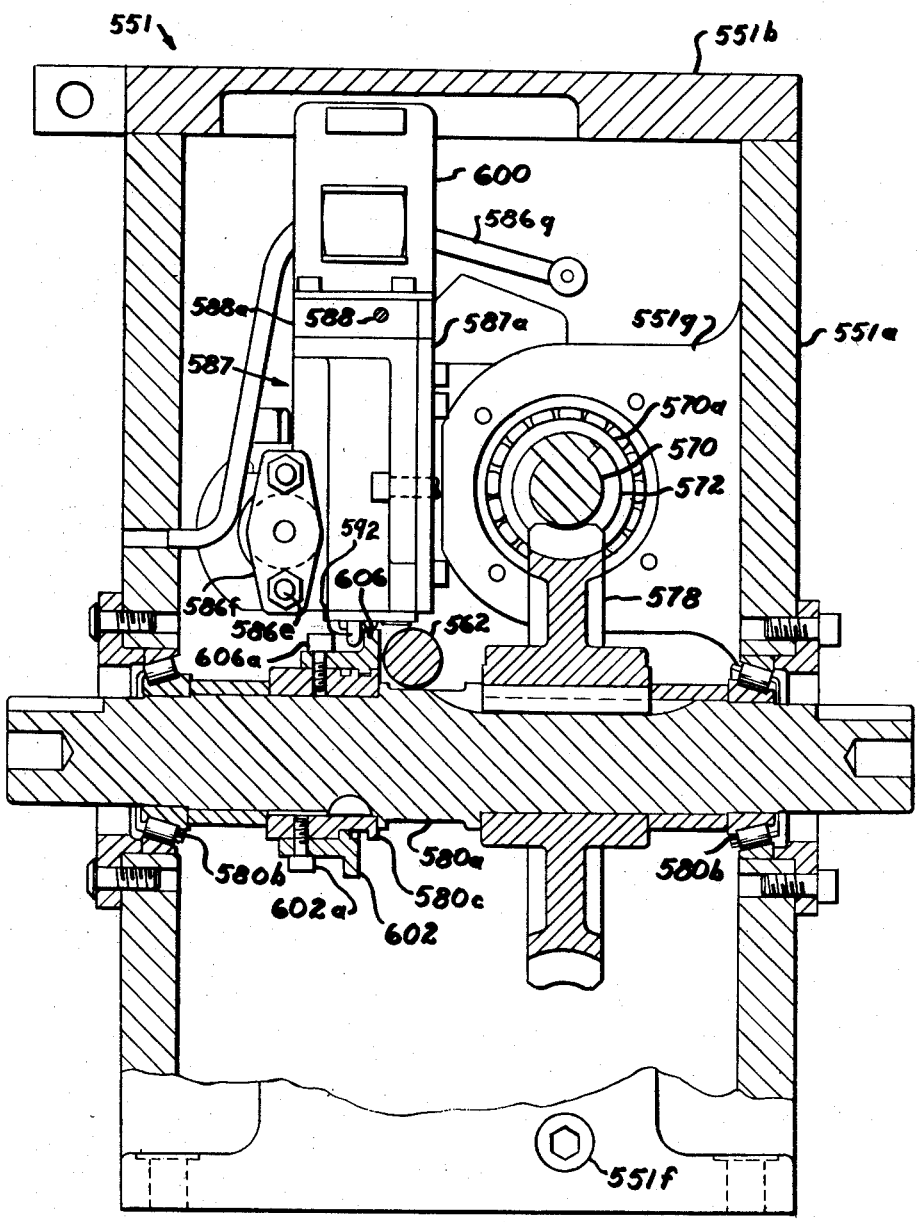

INVENTOR
EARL A. THOMPSON
BY Ralph L. Tweedale
ATTORNEY

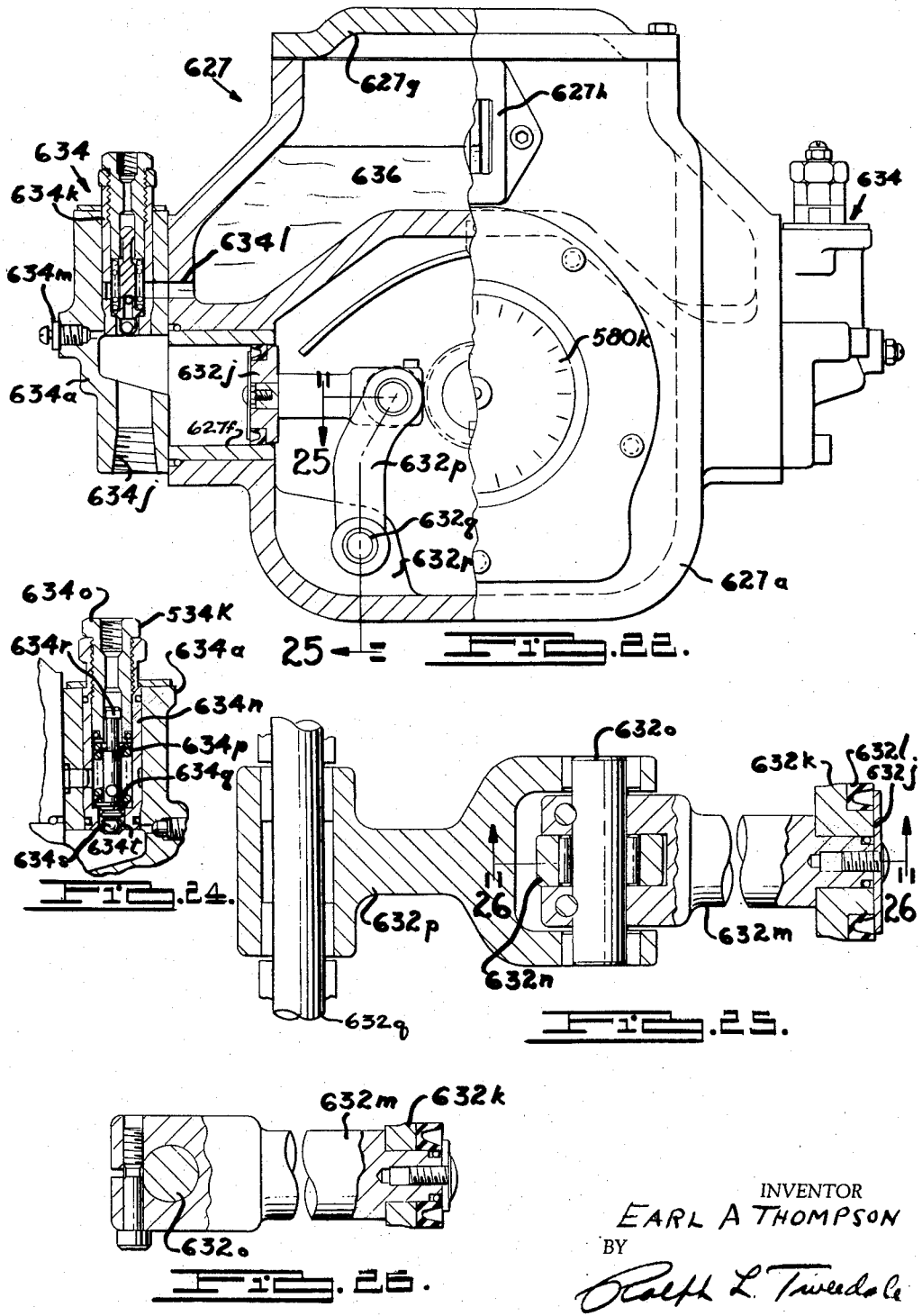

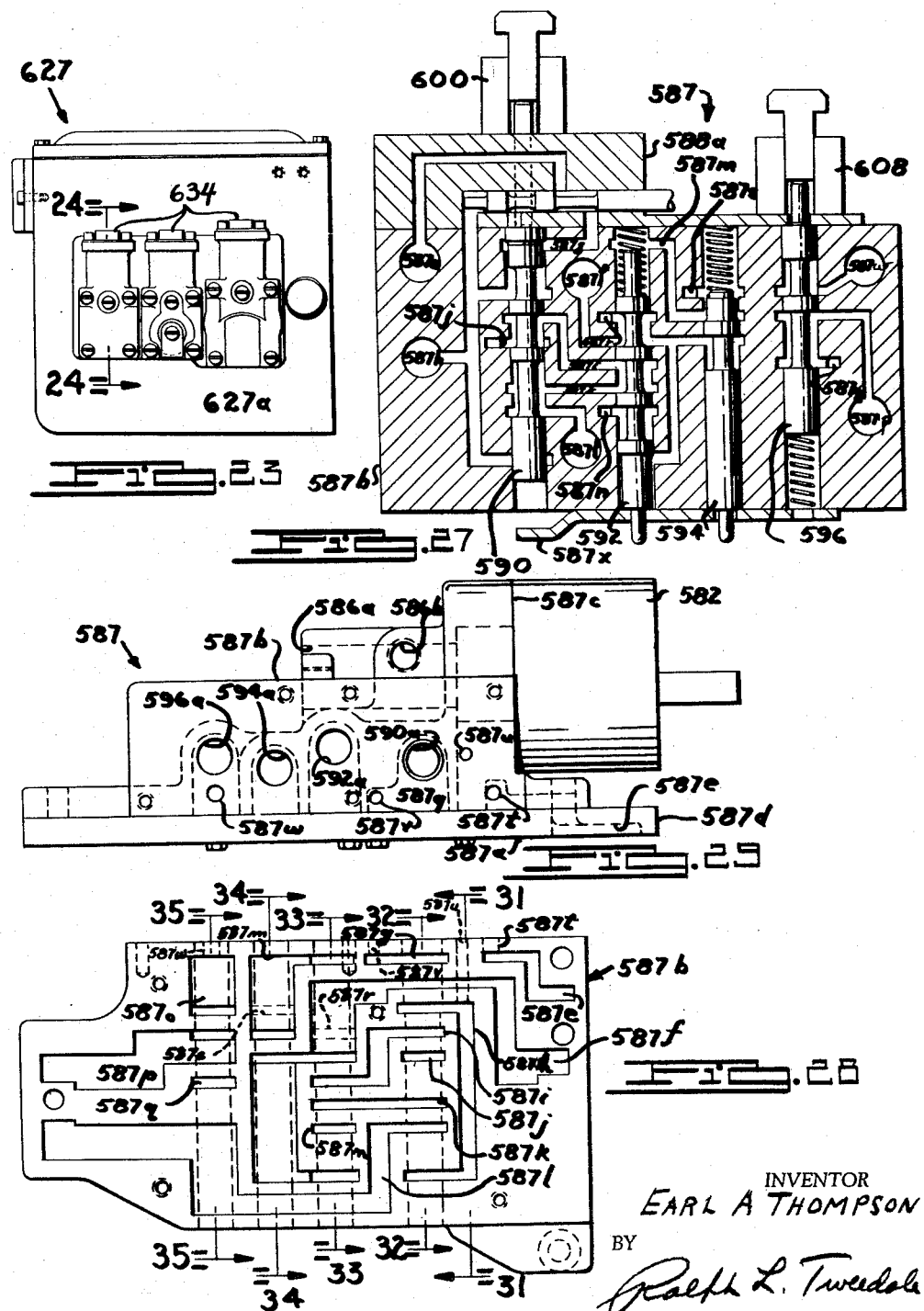

Jan. 8, 1963  E. A. THOMPSON  3,071,929
MECHANICO-HYDRAULIC POWER AND CONTROL UNIT
Filed Jan. 8, 1958  18 Sheets-Sheet 16
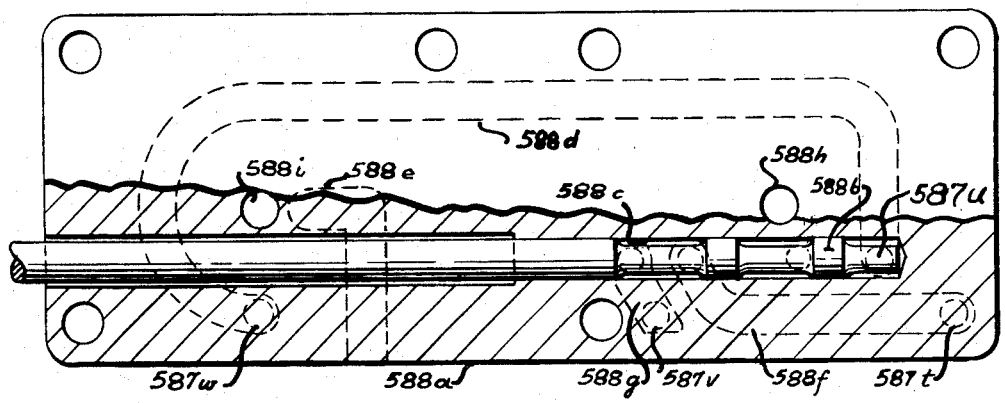
Fig. 30.
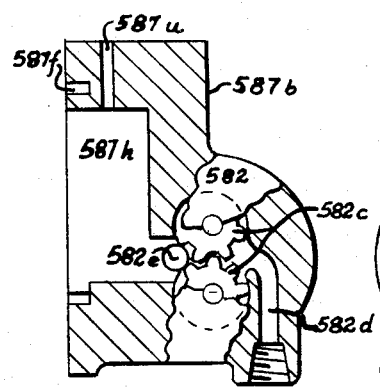 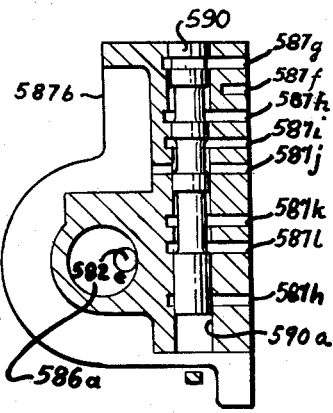 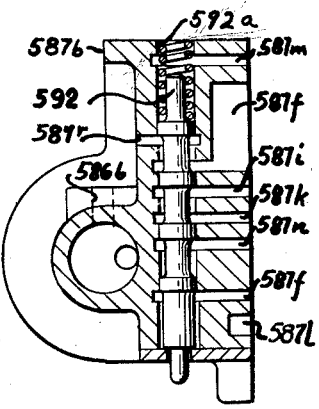
Fig. 31.  Fig. 32.  Fig. 33.
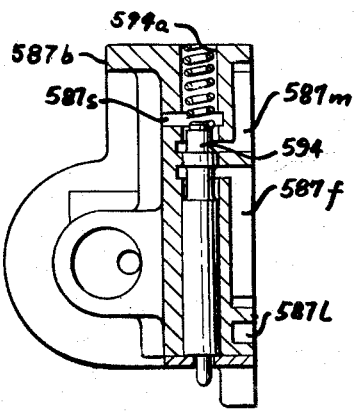 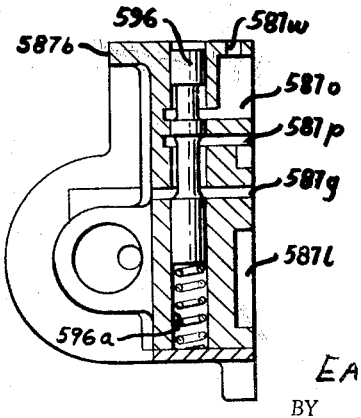
Fig. 34.  Fig. 35.
INVENTOR
EARL A THOMPSON
BY
Ralph L. Tweedale
ATTORNEY

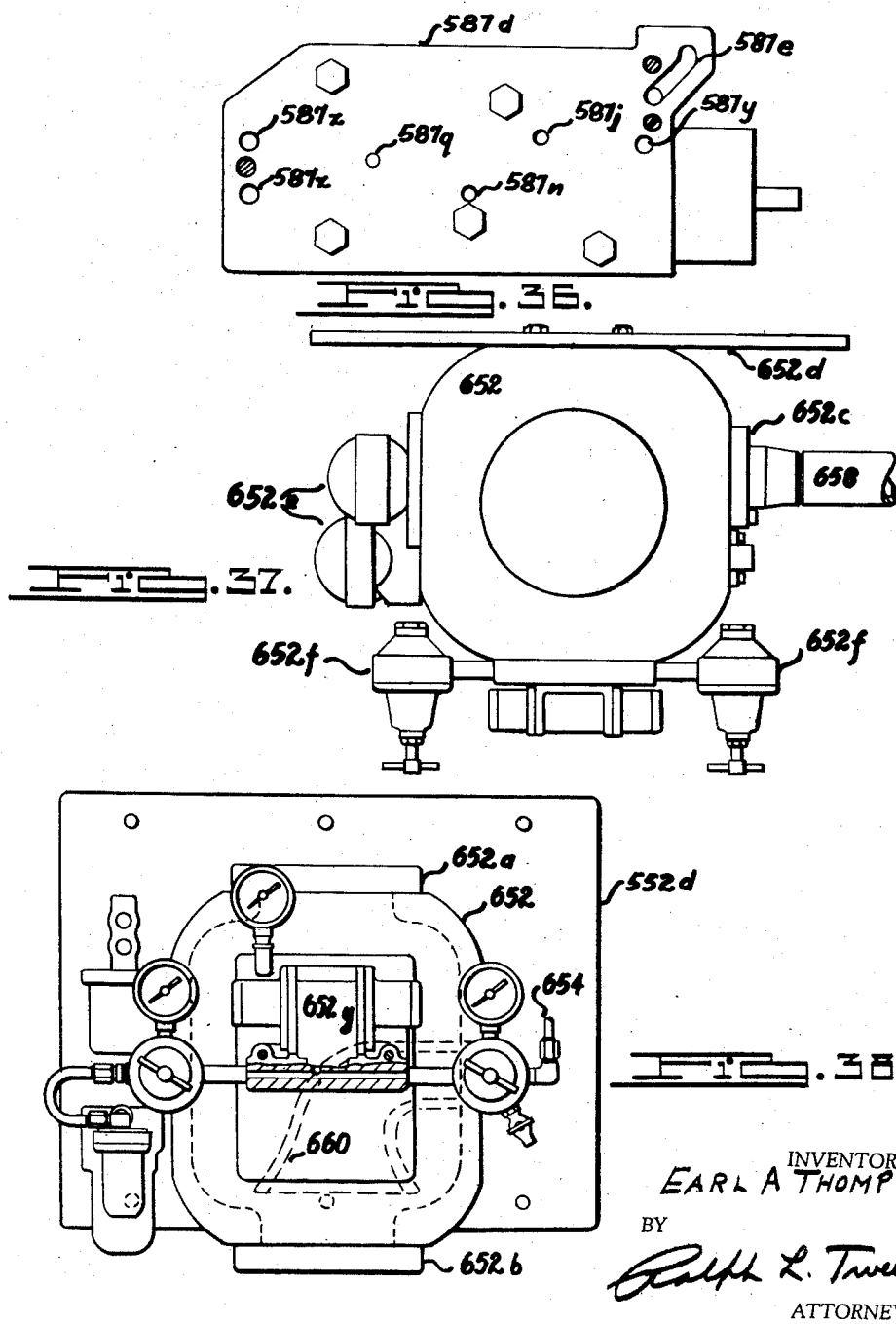

United States Patent Office 3,071,929
Patented Jan. 8, 1963

3,071,929
MECHANICO-HYDRAULIC POWER
AND CONTROL UNIT
Earl A. Thompson, Ferndale, Mich.
(1300 Hilton Road, Ferndale Station, Detroit 20, Mich.)
Filed Jan. 8, 1958, Ser. No. 707,802
42 Claims. (Cl. 60—54.5)

This application is a continuation-in-part of this inventor's applications Serial No. 538,096, filed October 3, 1955, for Hydraulic Control Mechanism, and Serial No. 570,806, filed March 12, 1956, for Hydraulic Control Unit, both applications being now abandoned.

This invention relates to a hydraulic controlling and driving mechanism for operating movable machine elements in a predetermined program of motions, and which is particularly suitable for operating such devices as machine tools, material handling equipment, assembly machines, testing, inspecting, sorting or packaging machines, and in fact any machinery where to and fro motions of machine elements require coordination of their timing, velocity, and acceleration patterns in repetitive cycles.

Prior to the present invention, machines having movable carriages, slides, and other shiftable elements have been operated either directly by mechanical gearing, such as cams, cranks, screws, and racks, or by fluid motors, especially of the hydraulic type under the control of valving for admitting and exhausting fluid. Mechanical gearing, while providing precise movements which are reliably repeated, involves rather expensive construction and is limited in its ability to meet the particular cycle requirements found in many modern machines, as well as being cumbersome and costly to apply and maintain. Fluid motor actuating systems, while providing great flexibility in their application to a wide variety of machinery problems, lack precision of movement and ability to reliably perform or duplicate required patterns of motion. In addition, both types of drive are very wasteful of power. In spite of these drawbacks, hydraulic drives are very widely used, particularly in the machine tool industry, except for certain high production automatic machinery where the same operating cycle is repeated continually in high volume production, as, for example, in automatic screw machines. For such operations, when the need to change the motion program is infrequent, mechanical cam drives are usually used because of their ability to accurately reproduce motion programs of any desired character.

It has heretofore been proposed to achieve both the accurate performance of mechanical drives and the application flexibility of hydraulic drives by using a mechanical cam to produce the required motions, and then transmitting such motions to the machine slide or carriage by a liquid column type of hydraulic motion transfer device or pulsator system, as, for example, in the patent to Arter No. 2,092,721. Such proposals have heretofore lacked the dependability and other performance characteristics required for commercial adoption and have met with little, if any, favor among machine designers.

It is an object of the present invention to provide an improved mechanico-hydraulic drive and control system utilizing cams and hydraulic pulsators which is not only readily adaptable to a variety of machine motivation requirements with complete flexibility as to location as well as to program cycles, but which is also capable of very precise repetition of a predetermined program of movements.

Another object is to provide a system of this character which may be produced in a small number of standardized versions for adaptation to a wide variety of machinery motivation requirements.

Another object is to provide a device of this character where a number of hydraulic pulsator sections may be operated in coordination with one another from a central master cam means, and in which the cam means may be driven at more than one speed during a single cycle.

It is also an object to provide a system of this character in which the elements of each cam pulsator section of the entire device are maintained at all times in a preloaded or biased condition against lost motion or play.

It is also an object to provide a system of this character having a high operating efficiency and which is economical and reliable for a long, useful life. In one of its aspects the invention contemplates an organization such as a machine tool wherein various components are actuated in a predetermined sequence throughout the cycle of operation. For example, in the case of a radius grinder of the automatic type, provision must be made for loading the collet, advancing the table on which the spindle supported collet is mounted axially toward the grinding wheel at a rapid rate, then advancing the table at a feed rate so that the work piece traverses the face of the grinding wheel, retracting the spindle away from the face of the grinding wheel, ejecting the work piece from the spindle supported collet, then moving the table back to the starting position to complete the cycle of operation. For maximum efficiency, these various operations must be started and stopped with a very precise timing; and furthermore, the various components must be actuated at a speed which is conducive to mass production. It is obvious that in the course of one cycle of the machine, these various operations must be performed in overlapping timed relation.

I have discovered that the operation of such machine components can be accomplished in a very accurate manner and at a desired speed through the use of cams which actuate pistons that in turn displace hydraulic fluid that is utilized for operating the component in the desired manner and at the desired rate. With this arrangement, a series of cams may be rotated and the cams positioned relative to one another so as to produce the required operations in the desired timed relationship; and the cams can be designed to produce the operation at a controlled desired rate of speed. For example, if it is desired to move the table of the machine through a particular range of its stroke with a harmonic motion, the corresponding portion of the periphery of the cam that controls the table movement can be designed to produce such harmonic motion.

Further objects and advantages of the present invention will be apparent from the following description, reference being had to the accompanying drawings wherein two forms of the present invention are illustrated.

In the drawings:

FIGURE 1 is an end view of a mechanico-hydraulic driving and control device incorporating one form of the present invention.

FIGURE 2 is a top view of the device shown in FIGURE 1.

FIGURE 6 is a horizontal sectional view of the cam box as viewed along the lines 6—6 in FIGURE 3.

FIGURE 7 is a view of a cam utilized in the mechanico-hydraulic control system.

FIGURE 8 is a sectional view of the cam box as viewed along the lines 8—8 in FIGURE 6.

FIGURE 9 is a view similar to FIGURE 8 as viewed along the lines 9—9 in FIGURE 6.

FIGURE 10 is a fragmentary view on an enlarged scale of the valve shown in FIGURE 8.

FIGURE 11 is a wiring diagram of the device shown in FIGURE 1.

FIGURE 12 is a mechanical and hydraulic diagram of the device shown in FIGURE 1.

FIGURE 13 is a diagram of a mechanico-hydraulic driving and control system embodying another form of the present invention.

FIGURE 16 is a section on line 16—16 of FIGURE 14, showing the electrical cam mechanism.

FIGURE 17 is a view on line 17—17 of FIGURE 15.

FIGURE 18 is a sectional view on line 18—18 of FIGURE 14.

FIGURE 19 is a sectional view on line 19—19 of FIGURE 18.

FIGURE 22 is an end view, partly in section, of the cam case illustrated in FIGURE 15.

FIGURE 23 is a side view of the cam case.

FIGURE 24 is a cross section on line 24—24 of FIGURE 23.

FIGURE 25 is a detailed view, partly in section, along the line 25—25 of FIGURE 22.

FIGURE 26 is a sectional view along line 26—26 of FIGURE 25.

FIGURE 27 is a sectional diagram of a valve block forming part of the transmission of FIGURE 18.

FIGURE 28 is a view of the valve block looking at its mounting surface.

FIGURE 29 is a top view of the valve block shown in FIGURE 28.

FIGURE 30 is a view, partly in section, of a valve block cover plate.

FIGURE 31 is a sectional view along the line 31—31 of FIGURE 28.

FIGURE 32 is a sectional view along the line 32—32 of FIGURE 28.

FIGURE 33 is a sectional view along the line 33—33 of FIGURE 28.

FIGURE 34 is a sectional view along the line 34—34 of FIGURE 28.

FIGURE 35 is a sectional view along the line 35—35 of FIGURE 28.

FIGURE 36 is a view of a valve block assembly looking in the same direction as in FIGURE 28.

FIGURE 37 is a top view of a return oil accumulator forming part of the mechanism of FIGURE 13.

FIGURE 38 is a side view of the accumulator shown in FIGURE 37.

In the form of the invention shown in FIGURES 1 through 12, there is provided a gear box 26, which in turn supports a cam box 28 at its front end and a motor 30 on its top face.

Figure 3:
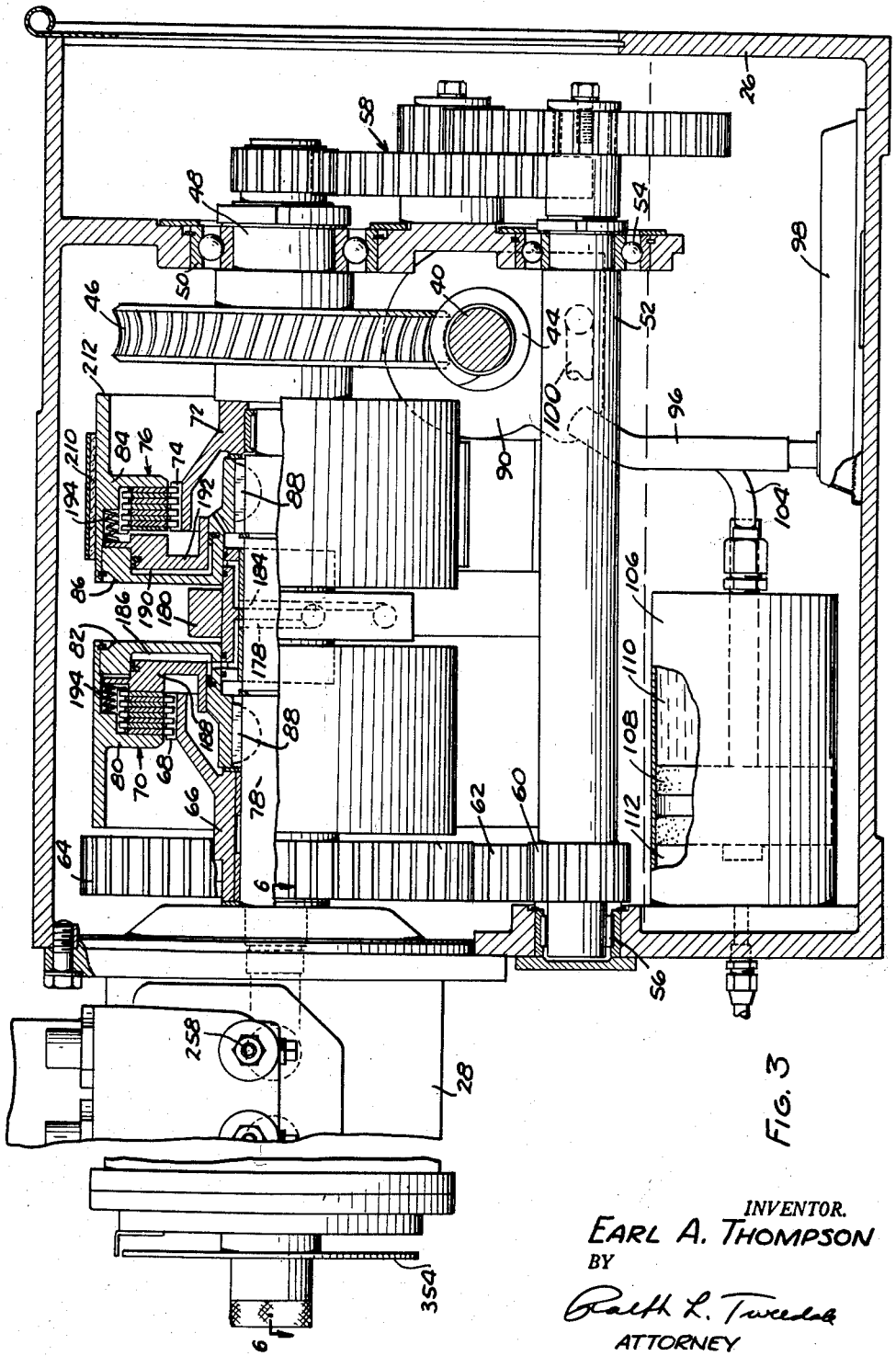
FIGURE 3 is a sectional view of the gearbox of the control mechanism of the machine as viewed along the lines 3—3 in FIGURE 1.
Figure 4:
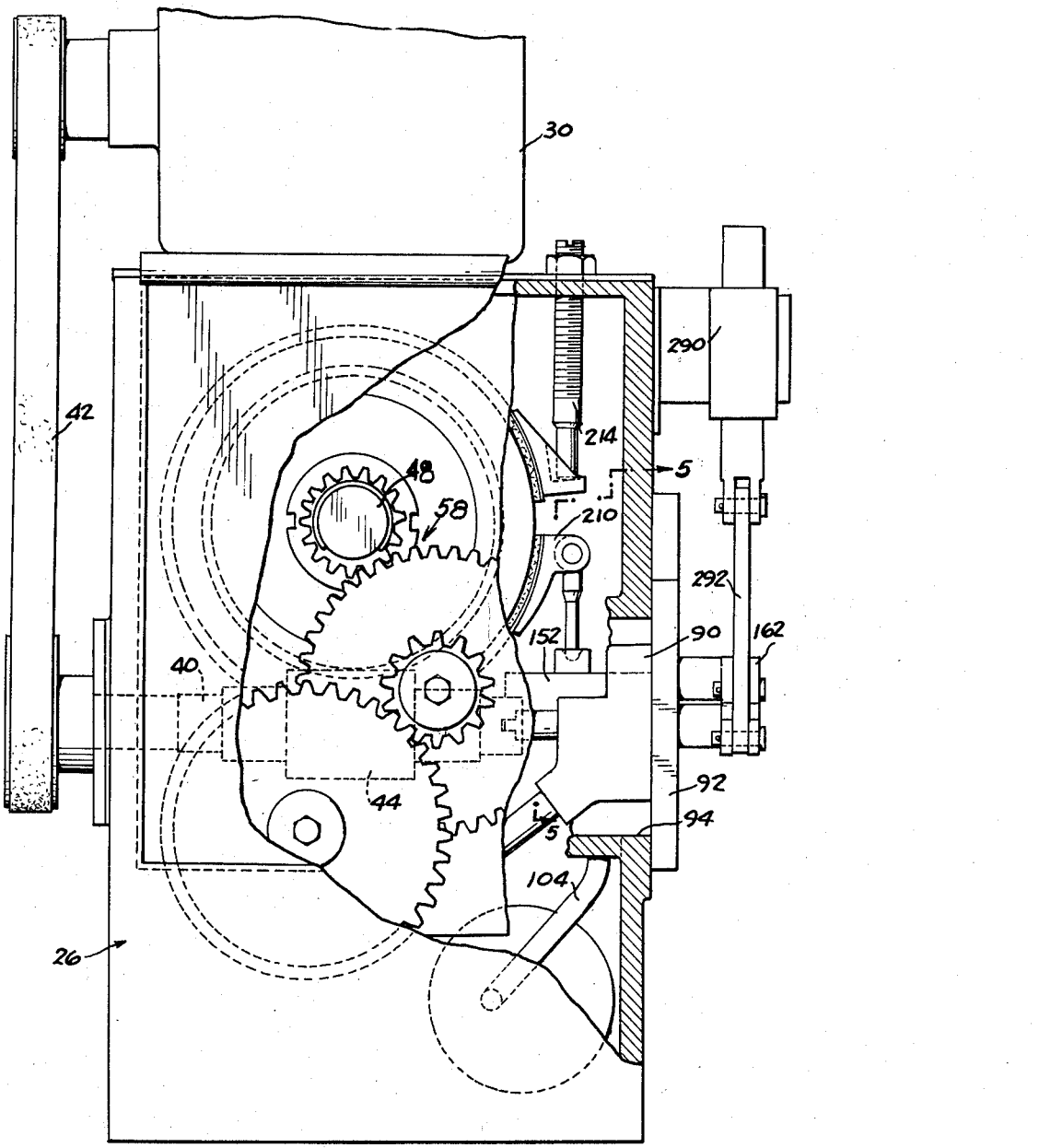
FIGURE 4 is a fragmentary part sectional view of the gearbox shown in FIGURE 3 as viewed from the rear side of the machine.

Referring now to FIGURES 3 and 4, it will be noted that motor 30 drives a shaft 40 in gearbox 26 through a belt 42. Shaft 40 is provided with a worm 44 which in turn meshes with a worm wheel 46 on a shaft 48 mounted in a bearing 50 within the gearbox. A second shaft 52 mounted in bearings 54 and 56 is driven by shaft 48 through a reduction gearing 58. Shaft 52 in turn drives through gears 60 and 62 a gear 64. The hub 66 of gear 64 supports the driving member 68 of a feed clutch 70, and the hub 72 of worm wheel 46 supports the driving member 74 of a rapid traverse clutch 76. Hubs 66 and 72 are rotatably supported on shaft 78. The driven member 80 of clutch 70 is fixed on a disc 82, and the driven member 84 of clutch 76 is fixed to a disc 86. Discs 82 and 86 are keyed to shaft 78 as by Woodruff keys 88.

With this clutch arrangement, when clutch 76 is engaged, shaft 78 will have a relatively high speed of rotation corresponding to the speed of shaft 48. When clutch 76 is disengaged and clutch 70 is engaged, then the drive of shaft 78 will be effected through the gear train 58, shaft 52, gears 60, 62 and 64; and the shaft 78 will therefore be rotated at a much slower speed.

Figure 5:
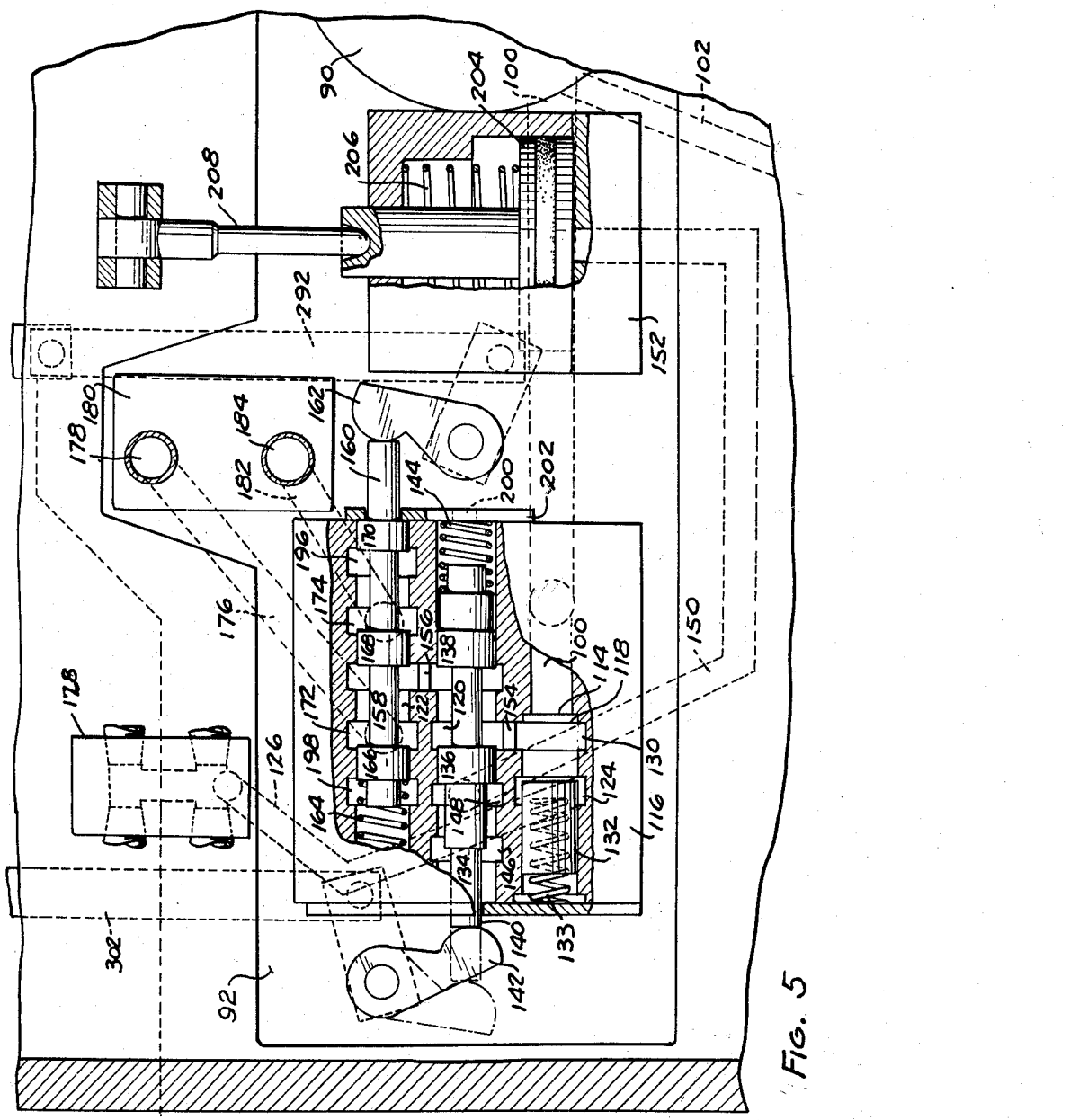
FIGURE 5 is a sectional view of a portion of the gearbox as viewed along the lines 5—5 in FIGURE 4.

Clutches 70 and 76 are arranged to be actuated hydraulically, and this hydraulic mechanism will now be described:

Referring to FIGURES 3, 4, and 5, shaft 40 drives a pump 90 which is mounted on a cover plate 92 which closes the opening 94 at one side of gearbox 26. The lower portion of gearbox 26 forms an oil reservoir which is preferably filled with oil to about the level indicated by the dashed line in FIGURE 3. The intake of pump 90 is connected by a conduit 96 with a filter 98 at the bottom of the oil reservoir. The outlet of pump 90 communicates with a conduit 100 (FIGURE 5) which is formed in cover plate 92. A branch conduit 102 in cover plate 92 extends from the pump 90 to a conduit 104 (FIGURES 3 and 4) which connects with an accumulator 106 in the oil reservoir. Within the accumulator, there is arranged a piston 108 which divides the accumulator into an oil chamber 110 and an air chamber 112. A source of air under pressure is admitted to the air chamber 112; and as the oil pressure in chamber 110 builds up by reason of the operation of pump 90, piston 108 is moved to the left as shown in FIGURE 3.

The outlet conduit 100 from pump 90 communicates with an inlet port 114 of a valve block 116. Valve block 116 is supported on cover plate 92 and is provided with bores 118, 120 and 122. Bore 118 is fashioned with a groove 124 which communicates by way of a passageway 126 in cover plate 92 with a lubricating manifold 128. A second annular groove 130 in bore 118 communicates with bore 120 by way of a port 154. The spring biased piston 132 in bore 118 serves as a pressure regulator and thus closes port 154 until the pressure reaches a predetermined value determined by the design of spring 133. Within bore 120, there is arranged a valve member 134 which is fashioned with spools 136 and 138. One end 140 of valve member 134 projects outwardly of valve block 116 and is biased into engagement with a crank 142 by means of a spring 144 at the opposite end of valve member 134. Bore 120 is fashioned with an annular exhaust groove 146. Bore 120 is also formed with a second annular groove 148 which connects as by a passageway 150 in cover plate 92 with a brake cylinder 152 also mounted on cover plate 92. Bore 120 is further provided with an annular groove forming a port 154 between bores 120 and 118 and with an annular groove forming a port 156 between bores 120 and 122. Within bore 122, there is arranged a valve member 158 which extends out of valve block 116 at one end as at 160 into engagement with a crank 162. A spring 164 at the other end of valve member 158 biases the end 160 of the valve member into engagement with crank 162. Valve member 158 is formed with spools 166, 168 and 170. Bore 122 is fashioned with spaced apart annular grooves 172 and 174. Groove 172 connects as by a passageway 176 in cover plate 92 with a passageway 178 in a distributor sleeve 180 on shaft 78, and annular groove 174 in bore 122 connects as by a passageway 182 with a passageway 184 in distributor sleeve 180.

As will be seen in FIGURE 3, passageway 178 communicates with a chamber 186 formed in clutch member 82 in which a piston 188 is arranged. Passageway 184 in distributor sleeve 180 connects with a chamber 190 formed in clutch member 86 and in which a piston 192 is movable. When oil under pressure is admitted to chamber 190, clutch 76 is engaged to rotate shaft 78 at a rapid rate; and when oil under pressure is admitted to chamber 186, clutch 70 is engaged to rotate shaft 78 at a much slower rate. Pistons 188 and 192 are biased by springs 194 to normally exhaust oil from the respective chambers and thereby disengage the respective clutches. In FIGURE 3, clutch 70 is shown in the engaged position and clutch 76 in the disengaged position. Likewise, in FIGURE 5, valve members 134 and 158 are shown in the positions they occupy to produce the engagement of clutch 70 and the disengagement of clutch 76. Thus, with these valve members in the positions indicated in FIGURE 5, oil under pressure discharged from pump 90 is caused to flow into bore 118 through port 154 and into bore 120. Spools 136 and 138 on valve member 134 direct this oil under pressure to port 156 and into bore 122. Spools 166 and 168 direct this oil under pressure to annular groove 172 and thence through passageways 176 and 178 to the chamber 186 of clutch 70. At the same time, it will be observed that annular groove 174 communicates with an annular groove 196 which exhausts into the oil reservoir of the gearbox. The other annular groove 198 in bore 122 which exhausts into the oil reservoir is blocked by spool 166. Thus, as oil is admitted to chamber 186 of clutch 70, piston 192 of clutch 76 moves under the influence of springs 194 to exhaust chamber 190 back through the valve block 116 and to the oil reservoir. If crank 162 is pivoted to the left as viewed in FIGURE 5, then spool 168 will seat on the land between annular groove 172 and port 156 and spool 170 will seat on the land between annular grooves 174 and 196. In this position, port 156 communicates with passageway 182 which leads to chamber 190 of clutch 76; and piston 188 will exhaust oil from chamber 186 back to the bore 122 through the annular groove 172 and then to exhaust through the annular groove 198.

If crank 142 is pivoted to the dotted line position shown in FIGURE 5, then valve member 134 will shift to the left under the influence of spring 144 to a position wherein spool 138 seats on the land between ports 154 and 156 and spool 136 seats on the land between grooves 146 and 148. In this position of valve member 134, the oil under pressure flowing through port 154 will be directed to the annular groove 148 and then through passageway 150 to the brake cylinder 152; and at the same time, the bore 122 will be opened to exhaust through port 156, bore 120 to the right of spool 138 and the exhaust port 200 in the end plate 202 on valve block 116.

Within brake cylinder 152, there is arranged a piston 204 which is biased by a spring 206 in a direction to exhaust oil from the cylinder. Piston 204 is arranged to actuate a push rod 208 which is pivotally connected to one end of a brake band 210, FIGURE 4. Brake band 210 wraps around the drum portion 212 of the driven member 84 of clutch 76. The opposite end of brake band 210 is held in an adjusted fixed position by a stud 214 (see FIGURE 4). Thus, with valve member 134 in the position illustrated in FIGURE 5, brake cylinder 152 connects with exhaust through passageway 150, annular groove 148 and annular groove 146. When valve member 134 is shifted to the left, then oil under pressure admitted to bore 120 through port 154 is directed to annular groove 148 and then through passageway 150 to the brake cylinder to apply the brake and thereby stop the rotation of shaft 78.

Accumulator 106 is provided so that the pump 90 can be of relatively small capacity. Under such circumstances, when either of the clutches is operated, the additional oil under pressure required to operate the clutches is supplied from the oil chamber 110 of the accumulator, which, by reason of the air pressure in chamber 112, serves as a reservoir for oil under pressure.

Referring now to FIGURE 6, it will be observed that the outer end of shaft 78 is journalled in a bearing 216 and has a keyed connection with one end of a hollow shaft 218 in cam box 28. The other end of shaft 218 is journalled in a bearing 220. Shaft 218 is formed with a keyway 222; and a series of cams 224, 226, 228, 230, 232, 234, 236 and 238 are keyed to rotate with this shaft. Cams 224 through 234 have cam followers associated therewith. These cam followers are in the form of rollers 240 and each is mounted on a piston 242.

Referring more particularly to FIGURE 8 wherein the pistons associated with cams 228 and 226 are illustrated, it will be observed that the cam box 28 forms an oil reservoir 244. The top of the cam box is provided with a cover plate 246, and a diaphragm 248 is arranged adjacent the cover 246 so that air under pressure can be admitted to the space 250 above diaphragm 248 and thus maintain the oil in reservoir 244 under a predetermined relatively low pressure.

The pistons 242 and the valves associated therewith are constructed and operate substantially the same for each of the cams, and a description of one of these pistons and the valve associated therewith will therefore suffice. Each piston 242 is slidably arranged within a cylinder 252; and at the outer end of cylinder 252, there is mounted a valve body 254. Valve body 254 is provided with a through passageway 256 which communicates with the outer end of cylinder 252 (FIGURE 10). An oil conduit 258a, b, c, d, e, or f, as the case may be, is connected with the outlet end of each through passageway 256. Each of the conduits 258 extends to the cylinder of one of the components of the machine the operation of which is hydraulically controlled. There is thus provided a liquid column confined within each respective cylinder 252, conduit 258, and actuating cylinder of a machine component. Valve body 254 is also fashioned with a bore 260 which intersects through passageway 256 at its lower end. A valve member 262 is biased by a spring 264 to seat on a valve seat 266 at the lower end of bore 260. The portion of valve 262 above seat 266 is provided with grooves 268 around its outer surface to permit the passage of oil around valve 262 when it is lifted off of seat 266. The intermediate portion of bore 260 is connected by a passageway 270 with reservoir 244. The tension of spring 264 and thus the pressure required to unseat valve 262 is controlled by an adjusting screw 272. Valve 262 is provided with a small bore 274 extending vertically therethrough, and this bore is normally closed at its lower end by a ball check 276 which is urged to seat in the end of bore 274 by a coil spring 278.

As is shown in FIGURES 6 and 9, cams 236 and 238 are arranged to actuate electric switches. Cam 238 has a pair of abutments 280 and 282 mounted thereon which are arranged to actuate switches 284 and 286, respectively. Switches 284 and 286 are in the nature of safety switches which are actuated each cycle of the machine; and if one of the machine components such as a work piece loader is not functioning properly, these switches are arranged to stop the operation of the machine. Cam 236 actuates a switch 288 which in turn energizes a solenoid 290 mounted on the side of gearbox 26. The armature of solenoid 290 (FIGURE 2) connects with a link 292 (FIGURE 5) which is pivotally connected to crank 162. Thus, during the period of each cycle that solenoid 290 is energized by switch 288, valve member 158 is shifted to the left as viewed in FIGURE 5 so as to energize clutch 76 and cause the shaft 78 and the cams on shaft 218 to rotate at the more rapid speed.

In the particular arrangement shown, switch 288 is actuated when the follower 294 rides over the high side 296 of cam 236; and when the follower 294 engages the low side 298 of cam 236, solenoid 290 is deenergized and spring 164 shifts valve member 158 to the position shown in FIGURE 5 so as to energize clutch 70 and deenergize clutch 76 and thus rotate shaft 78 and the cams on shaft 218 at a relatively slow speed. A second solenoid 300 mounted at the side of gearbox 26 has its armature connected to a link 302 which is in turn pivotally connected with the crank 142 (FIGURE 5) that actuates valve member 134. Solenoid 300 is energized through a manually actuated switch described hereinafter.

As mentioned previously, the conduits 258 each extend to the cylinder of one of the machine components that is hydraulically actuated. One of these conduits, namely, conduit 258b, connects with a cylinder 304 (FIGURE 12).

Slidably mounted in cylinder 304 is a piston 340, which may be connected by means of a stud 334 with a table, slide, or carriage 24 of a machine tool or other device. Also pivoted to the stud 304 is a piston 342 slidable in a stationary cylinder 344. The inlet port 350 of cylinder 344 is connected by a conduit with a plenary volume liquid pressure source such as an accumulator 321. The several circles marked "RO" in FIGURE 12 are intended to designate, preferably, a single accumulator and a manifold which connects all of the cylinder ends together to the common liquid pressure source. This may be a pressure vessel containing oil or other power transmitting liquid maintained under a high pressure by a body of compressed air or other gas. Such a device forms a convenient source of a plenary volume of liquid under pressure and which is available for utilization as required, although it will be understood that other sources, such as spring or weight-loaded accumulators, constant volume pumps with pressure relief valves, or variable volume pumps with pressure responsive volume regulators may be utilized, and the term plenary volume liquid pressure source is intended to include all such devices.

It will be appreciated that the various components that are controlled by the cams on shaft 218 can be operated at a desired rate by designing the shape of the particular cam so as to produce the rate of movement desired. At the same time, the operation of the various components can be timed relative to one another by the relative positions of the cams on shaft 218. As an example, there is shown in FIGURE 7, the cam 226 that may be employed for controlling the rate of movement on table 24. Let us assume that when the cam follower on the piston 242 engages the cam 226 at the point $a$, the table is positioned against the front stop 330. As the cam rotates in a clockwise direction, the cam follower travels relatively around the periphery of the cam from the point $a$ to approximately point $b$. During this interval of movement, the cam 236 (FIGURE 9) which actuates the fast and slow speed switch 288 is designed to maintain the solenoid 290 energized. In other words, the follower 294 rides on the high side 296 of cam 236; and the shaft 218, together with the cams, rotates relatively rapidly, because the crank 162 (FIGURE 5) positions the valve member 158 in the valve block 116 so as to direct oil under pressure to the rapid traverse clutch 76. During this interval of time, the piston 242 actuated by cam 226 moves outwardly and feeds oil under pressure to the cylinder 304 on the table feed mechanism. The oil is displaced into cylinder 304 at a rate corresponding to the travel of the piston 242 as controlled by the rate of rise on the periphery of the cam 226. Thus, with the cam illustrated, the table would be advanced first with an accelerated movement; and the rate of acceleration decreases as the cam follower approaches the point $b$ on cam 226. At this time, the cam follower 294 associated with cam 236 rides onto the low side 298 of cam 236 and solenoid 290 is thereby deenergized. This causes feed clutch 70 to engage, and the piston 192 of clutch 76 moves under the influence of spring 194 to direct the oil therein to exhaust. Thus, at this point, shaft 218 and the cams thereon rotate at a relatively slow feed rate; and the piston associated with cam 226 continues to move outwardly at a more or less constant rate as determined by the rise on the periphery of cam 226 between the points $b$ and $c$. At the point $c$, the table 24 is positioned against a rear stop 332. It will be observed that the periphery of the cam 226 continues to rise beyond the point $c$; and thus, even after the table contacts the rear stop 332, the piston 242 associated with cam 226 continues to move outwardly and to feed oil under pressure into the through passageway 256 of valve body 254. Since the table is up against the stop 332, the pressure in passageway 256 builds up to a value sufficient to unseat valve member 262; and the excess oil is bled back into the reservoir 244 around valve member 262 and through passageway 270. At the high point $d$ on cam 226, the piston has moved outwardly the maximum amount and the cam follower then tends to ride down the low side of the cam from the point $d$ to the point $e$. At the point $d$ on cam 226, the cam follower 294 associated with cam 236 is arranged to ride up to the high side 296 of cam 236, thereby actuating the switch 288 energizing solenoid 290 and causing rapid traverse clutch 76 to engage and feed clutch 70 to disengage. Thus, the cams on shaft 218 are caused to rotate at a more rapid rate. As the cam follower starts to ride down the decline between the points $d$ and $e$ on cam 226, the oil pressure of accumulator 321 acting in cylinder 344 causes piston 342 (FIGURE 12) to move to the right; and the table 24 thus travels on its return stroke towards the starting position.

During the return movement of the table, piston 340 in cylinder 304 discharges oil back into the line 258b and thus causes the cam follower associated with cam 226 to ride around the periphery of the cam between the points $d$ and $e$. The adjusting screw 272 is set so that the valve member 262 unseats at a pressure higher than the accumulator pressure; and thus, the table is caused to retract at a rate controlled by the shape of the cam between points $d$ and $e$. When the cam follower reaches the point $e$ on cam 226, the table is fully retracted against a front stop 330. However, between the points $e$ and $f$, the periphery of the cam still has a slight fall or decline; and thus, as the follower travels between the points $e$ and $f$, the pressure in the passageway 256 tends to fall below the pressure of the oil in reservoir 244. At this time, check valve 276 opens; and the oil that was previously bled out of the system between the points $c$ and $d$ is thus charged back into the passageway 256 to condition the system for the next cycle of operation. The radius of cam 226 is constant from the points $f$ to $a$; and during this portion of the cycle, table 24 simply dwells against the front stop 330. During this later interval of time, loading and unloading mechanism may be operated by other cams on camshaft 218.

In order to ascertain at which point in the cycle of the machine these various operations start and stop, there is mounted at the front end of shaft 218 a timing disc 354 (FIGURE 6). Disc 354 has an indicator 356 associated therewith and is calibrated circumferentially in degrees so that the operator can, at a glance, determine at which portion of the cycle the machine is operating at any given instant. Timing disc 354 is fixed on a bushing 358 which is in turn fixed on a spindle 360 secured to rotate with shaft 218. The entire assembly at the front end of the cam box is supported by means of the bearing 220 in the boss 362 on the cover plate 364 which closes the front end of the cam box. Just inwardly of bearing 220, shaft 218 is provided with a nut 365 for tightly clamping the series of cams on shaft 218.

The piston 242, operated by cam 224, connects by conduit 258a with another machine tool operating cylinder, such as shown at 354 in FIGURE 12. This may have a piston 356, the rod 358 of which serves to operate the machine element, such, for example, as a work ejector 359 in a hydraulically operated spindle and collet assembly. The piston 242, operated by cam 228, connects by a liquid column line 258c with the cylinder 360. The latter has a piston 362 having a hollow end 364 which may serve to operate a third machine element, for example a spindle collet 365. The opposite ends of cylinders 354 and 360 are connected to the plenary volume source of pressure liquid, indicated at "RO," as previously described.

In FIGURE 11, a suitable wiring circuit for the machine is illustrated. A normally closed stop switch 494 and a normally open start switch 496 are connected across the line 498 through a solenoid 500 of a relay 502. Relay 502 is in the nature of a circuit holding relay and at the same time when energized closes switches 504 and 506. Switch 504 is the holding circuit for relay solenoid 500 and switch 506 may control motor 30. A cycle start and a cycle stop switch 508 and 510 are also connected across the line 498 through the relay switch 512, the holding contacts 504 of relay 502 and switch 494. The solenoid 514 of relay 512 is connected across the line 498 in series with the normally open start switch 508. Solenoid 290 which controls the operation of clutches 70 and 76 is connected across the line in series with switch 288, stop switch 510, the holding circuit of relay 502 and stop switch 494. Relay 300 which controls the actuation of the brake on shaft 78 is connected across the line in series with cycle stop switch 510, a holding circuit of relay 502 and stop switch 494. The safety circuit generally designated 516, in which are connected switches 284 and 286 which are energized by abutments 280 and 282 on cam 238, controls a relay 518 which is adapted to break the circuit through brake solenoid 300 in response to improper functioning. This circuit extends from brake solenoid 300 through cycle stop switch 510, relay 518, relay 512, holding circuit 504, and stop switch 494. Thus, when the motor starting switch 496 is momentarily closed, the transmission motor 30 is energized. Upon depression of cycle starting switch 508, the brake on shaft 78 is released and the cycle of operation is started. If it is desired to stop the cycle at any point, it is only necessary to momentarily depress cycle stop switch 510 to apply the brake and thereby stop the rotation of cam shaft 218.

The initiation and the termination of each operation is controlled by the positioning of the corresponding cam on the shaft 218 relative to the other cams. In addition, the rate at which the operation is performed throughout various portions of the cycle is controlled by the design of the cam. Thus, as pointed out above, if it is desired to have the table move with a harmonic motion to the start of the feed cycle and from the end of the feed cycle back to the starting position, then the portion of the cam 226 between the points a and b and between the points d and e are designed to produce this harmonic motion. Obviously, the other operations described can be similarly controlled. Furthermore, it will be noted that the range of movement of the table and of the other machine elements is very accurately controlled between front and back stops.

In order to insure movement of these members into positive engagement with the respective stops, the respective cams are designed to shift the associated pistons 242 through a stroke greater than that required to produce the necessary range of movement. The pop-off valves 262 with the associated ball checks 276 are utilized for bleeding the excess oil from the lines 258 when these members reach one end of the stroke and for replenishing the oil into these lines when the members reach the other ends of their strokes. The cams that are associated with pistons 242 are all designed on this general principle. The high side of the cam is designed to bleed oil from the circuit when the controlled member reaches one limit of its movement. The low side of the cam is designed to permit the circuit to be recharged through ball check 276 when the controlled member reaches the other limit of its movement in response to its actuation under the influence of the pressure from accumulator 321.

After the machine is once set in operation as by closing of the starting switch 496, it continues to operate automatically, one complete cycle of operation being performed during each revolution of the cam shaft 218.

When the table reaches the end of its work stroke, switch 288 is again actuated to release clutch 70 and engage the rapid traverse clutch 76. The table is then returned to the starting position by means of the pressure in accumulator 321, but the rate at which the table is returned is controlled by the shape of the cam 226. At this point cams 228 and 224 may operate so that the collet is expanded and the work piece ejected. If it is desired to stop the operation of the machine at any instant during its cycle of operation, the cycle stop switch 510 is manually actuated to deenergize solenoid 300 and thus apply an instant braking effect to the shaft 78 to which the cam shaft 218 is secured.

In the form of the invention illustrated in FIGURES 13 through 44, the mechanico-hydraulic driving and control unit includes a self-controlled two-speed transmission 551 shown diagrammatically in the left-hand half of FIGURE 13, and a program cam and motion transmitting system 627 shown generally, in the right-hand half of FIGURE 13. The transmission may be driven from a suitable rotary source of power, such as the electric motor 550. The motor drives the input shaft 552 of the transmission through a belt drive 554. The input shaft 552 drives a pinion 556 and also the input member of a hydraulically engaged, spring released clutch 558. Pinion 556 drives a gear 560 secured to a countershaft 562 which carries a pinion 564 at its opposite end. Pinion 564 drives a gear 566 and therewith constitutes a set of speed change gears. Gear 566 drives the input member of a second hydraulically engaged, spring released clutch 568. The driven members of the clutches 558 and 568 are secured to the opposite ends of a shaft 570, having a worm 572 thereon and a brake drum 574. The latter has a spring biased, hydraulic motor 576 for engaging the brake. The worm 572 drives a worm wheel 578 secured to the camshaft 580.

For the purpose of automatically controlling the starting, stopping, and speed of the transmission, there is provided a control assembly 587 comprising a hydraulic control pump 582 driven from the gear 566 and which may circulate a body of oil contained in the transmission housing for control, lubricating and auxiliary power purposes. The pump 582 may deliver to a combined accumulator and relief valve 586 comprising a spring loaded piston and spill-over port, and also supplies oil to a bank of control valves 588, 590, 592, and 594 and 596. In the diagram the valves 588, 592, 594, and 596 are shown as two-position valves and the valve 590 as a three-position valve, all of which have a normal position in which the connections shown in the cross-hatched rectangles are established. Single-headed arrows are used to indicate flow at reservoir pressure and double-headed arrows to indicate flow at pump delivery pressure. Each of the valves, when shifted, establishes the connections shown in one of the unhatched rectangles. Valve 588 may be manually operated. Valve 590 is biased to its normal position by fluid pressure from the accumulator in the rod end of a differential cylinder 598.

The valve 590 may be shifted to its mid-position by a solenoid 600 and may be shifted to its extreme position by the admission of pressure fluid from the accumulator to the head end of cylinder 598 under the control of valve 588. Valve 592 is spring biased to normal position and may be shifted to its other position by an adjustable cam 602 on the camshaft 580. Valve 592 also has a hydraulic holding cylinder 604 which holds the valve in its shifted position until it is released by the shifting of valve 594. Valve 594 is spring biased to normal position and may be shifted by an adjustable cam 606 on camshaft 580. Valve 596 is also spring biased to its normal position and may be shifted by a solenoid 608.

Valve 588, in its normal position, exhausts the head end of cylinder 598 and also connects the brake cylinder 576 with either pressure or exhaust depending upon whether valve 590 is in its normal or intermediate position respectively. In its shifted position valve 588 admits pressure fluid to the head end of cylinder 598 for the purpose of shifting valve 590 to its extreme position and also connects the brake cylinder 576 directly to exhaust independently of valve 590. The valve 588 and the extreme position of valve 590 are provided for the purpose of manually releasing the brake 576 and engaging the low speed clutch 568 so that cam shaft 580 will turn at its slow speed under manual control for "inching" purposes and the like, and it will be understood that this is an accessory feature which may optionally be omitted if desired.

Valve 590, in the position shown, delivers pressure fluid to cylinder 576 for engaging the brake and also exhausts fluid from the low speed clutch 568. When shifted to its intermediate position by solenoid 600, the valve 590 exhausts cylinder 576 to release the brake and supplies pressure fluid to engage the low speed clutch 568, subject, however, to a conjoint control by the valve 592.

Valve 592, in its normal position, exhausts fluid to release the high speed clutch 558 and places the low speed clutch 568 under the control of valve 590. In its shifted position, valve 592, provided valve 590 has been shifted, delivers pressure fluid to engage high speed clutch 558 and exhausts fluid to release low speed clutch 568. As previously explained, the valve 594 is merely a reset valve for bypassing the holding cylinder 604 to permit valve 592 to return to its spring biased, normal position.

Thus, operation of the control assembly 587 is such that energization of solenoid 600 will start the cam shaft 580 rotating at slow speed. Thereafter, the cam 602 will shift the transmission to drive the cam shaft at high speed, and still later the cam 606 will again shift the transmission to low speed. So long as the solenoid 600 remains energized, cam shaft 580 will continue to rotate, first at a slow speed and then at a high speed during each revolution, controlling its own speed by operation of the cams 602 and 606.

The valve 596 forms an auxiliary valve independently of the other four which may be utilized optionally for various purposes, particularly when it is desired to operate a movable element in the system during an interval when the cam shaft 580 is stationary. Thus, the valve 596 controls a motor line 610 and in normal position exhausts the same. When solenoid 608 is energized to shift valve 596, the motor line 610 is connected to accumulator pressure.

For the purpose of controlling the drive motor 550 and the solenoids 600 and 608, there is provided an electric control circuit connected between a pair of electric supply lines designated L–1 and L–2. The circuit may include a master relay 612 of the holding type, having a manual master start switch 614 and a manual master stop switch 616. When energized, the relay 612 controls the motor 550 and also a cycle control relay 618 of the holding type, having a manual cycle start switch 620 and a manual cycle stop switch 622. In addition, the master relay 612 controls the supply of current to the solenoid 608 through the normally closed contacts of a cam switch 624 on the cam shaft 580 and through a manual or other switch 626.

The normally open contacts of relay 618, which are of the make-before-break type, control energization of the cycle solenoid 600 directly. The normally closed contacts of relay 618 also control solenoid 600 but are in series with the normally open contacts of cam switch 624, which are arranged to be open whenever the cam shaft reaches a predetermined point in its rotation. The arrangement is such that when the cycle stop switch 622 is operated at any point in the rotation of cam shaft 580, relay 618 will be deenergized, but solenoid 600 will remain energized until the cam switch 624 opens at the predetermined stopping point. Operation of the master stop switch 616, however, will deenergize solenoid 600 immediately regardless of the point in the cycle and will also deenergize motor 550.

It will thus be seen that the self-controlled two-speed transmission 587 serves, whenever the cycle start switch 620 has been operated, to energize solenoid 600, shifting valve 590 to its intermediate position which releases brake 576 and engages low speed clutch 568 to cause the cam shaft 580 to be driven at slow speed from motor 550 through the gearing 556, 560, 564, 566, 572, and 578. At the pre-selected point in each revolution of cam shaft 580, cam 602 will shift valve 592 to disengage the low speed clutch 568 and engage the high speed clutch 558 whereby the cam shaft will be driven at a high speed through reduction gearing 572—578, only. At another pre-selected point in each revolution of the cam shaft 580, the cam 606 will trip the reset valve 594, thus disengaging the high speed clutch 558 and reengaging the low speed clutch 568 to continue the rotation of the cam shaft at slow speed. These cycles of fast and slow rotation of the cam shaft 580 will repeat each revolution until the cycle stop switch 622 is operated, which brings the cam shaft 580 to a stop at the predetermined stopping point. At this point, cam switch 624 also enables the solenoid 608 to be energized by the switch 626 for the purpose of supplying accumulator pressure fluid to the motor line 610 for auxiliary power purposes.

The cam shaft 580 drives a programming and motion transfer device 627 comprising a number of cam operated hydraulic pulsator sections, designated by subscripts $a$ through $i$, inclusive. Each section may comprise a cam 628 which has a contour shaped to provide the desired acceleration, velocity, deceleration, and dwells for any particular movable machine element which is to be actuated. Each cam 628 has a follower 630 mechanically connected to an expansible chamber device such as the transmitting piston and cylinder 632. Each transmitter unit 632 has a balance valve assembly 634 which may also constitute the cylinder head and which contains a spring loaded relief valve opening out of the chamber and a replenishing check valve opening into the chamber. Each balance valve is connected with a replenishing reservoir 636 which is preferably maintained at a slight superatmospheric pressure as, for example, by connection to regulated compressed air supply source 638.

Each expansible chamber 632 constitutes the pulse transmitter of a liquid column type motion transfer device, including a closed liquid column conduit 640 which is connected to a pulse receiver in the form of a hydraulic motor connected to actuate the movable machine element or slide which is to be motivated by the particular cam-pulsator section concerned.

Such receiver motors may take any of a variety of forms, some of which are illustrated in FIGURE 13. Thus, the sections a, b, and c may be utilized for operating a two-pressure receiver motor for pressing, clamping and the like and comprising a principal cylinder 642 and an intensifier cylinder 644. The motor 642 may have a piston and rod 646 which are operated through a normal substantially full stroke by the combined displacement of transmittter units 628b and 628c. The liquid column line 640bc connects with the head end of cylinder 642 through a port in the side wall of a reduced diameter cylinder 647 in which an intensifier plunger 648 is slidable to close off the liquid line 640 and to intensify the pressure in the head end of cylinder 642. For this purpose the intensifier cylinder 644 has a large diameter piston 650 which operates the plunger 648 in accordance with displacements of the transmitter 632a.

The rod ends of both cylinders 642 and 644 are connected with a supply of return oil marked "RO" in FIGURE 13 for diagrammatic purposes. It will be understood that the return oil supply may be constituted by either separate sources or a common source which can supply a plenary volume of fluid under high pressure. It is preferred to connect the return end of all cylinders together so as to allow for transferring motion from an advancing cam to another cam which is receding whenever possible. It is preferred to utilize a gas loaded liquid accumulator as the plenary volume high pressure source, although it will be understood that other sources such as spring or weight loaded accumulators, variable displacement pumps with pressure compensation, or fixed displacement pumps with relief valves may be utilized.

In FIGURE 13 there is illustrated a gas loaded accumulator 652 comprising a container having a connection with a regulated source of compressed air 654 and containing a body of oil or other power transmitting liquid 656. An outlet pipe 658 has a downwardly, opening, flared, entrance horn 660 for the purpose of assuring the intake of air free oil. The outlet 658 connects with a return oil manifold 662 which connects by branch conduits, not illustrated, with the return ends of cylinders 642 and 644 and with any other points in the system where a constantly acting fluid pressure bias is required.

The cam-pulsator section d is utilized for operating a hydraulic motor 664, having a piston 666 provided with a rack for operating an oscillatory pinion 668. The motor 664 may be provided with an auxiliary operator for the purpose of enabling the pinion 668 to be driven when cam shaft 580 is stationary. For this purpose an auxiliary piston 670 is provided at the left end of motor 664 and has its head exposed to the pressure in the auxiliary motor line 610. The right end of the motor 664 may be connected to the return oil manifold 662, as indicated at "RO."

The cam-pulsator sections e and g are illustrated as forming a double-acting motivation system for a rectilinear fluid motor 672 having a piston 674 therein provided with rods on both ends. Likewise, the cam-pulsator sections f and h are connected to opposite ends of a balanced piston hydraulic motor 676, having a piston 678 provided with a rack for driving a pinion 680. The cam-pulsator section i is connected with a dual hydraulic motor 682, the pistons 684 of which have racks engaged with a pinion 686. The right-hand end of the uppermost cylinder of motor 682 is connected with the return oil manifold 662, as shown at "RO."

Each of the fluid motors operates between limit stops which are so arranged that the total displacement of each fluid motor is slightly less than the displacement of the corresponding transmitter unit 632. These stops may be formed as separate, adjustable screw stops, or merely as the normal interior end surfaces of the cylinders within which their pistons operate. It will be seen that each of the cams 628 may be contoured to provide for the desired motion of the particular machine element controlled by the respective cam and for the proper time sequence of such motions with the motions of the other cams so that during a single revolution of the cam shaft 580 all of the machine elements partake of the forward and return motion which they are required to perform.

With respect to the single-acting motors 642, 644, 664, and 682, the advancing movement is governed by the rising part of the contour of cam 628 and this is transmitted through the liquid column line 640 to the corresponding motor. Due to the slight excess displacement in the transmitter chamber 632, the final part of the rise will be ineffective to operate the motor because the latter will have already reached the limit of its stroke, accordingly, a small amount of fluid will be displaced to the reservoir 636 through the relief valve built into the cylinder head 634.

As the falling part of each cam 628 comes under the follower 630, the return oil pressure maintains a continual bias transmitted through the motor piston to the liquid column 640 and transmitter chamber 632 so as to maintain the follower 630 in engagement with the falling part of the cam. The final part of the cam fall, however, will take place without this return oil bias on the system because the motor piston will have reached the limit of its stroke. During this final fall, the make-up oil in the reservoir 636 will enter the transmitter unit 632 through the replenishing check valve built into the cylinder head 634, thus, returning to the liquid column the quantity of oil displaced through the relief valve at the end of the advance stroke and also making up for any possible loss of fluid through leakage.

The contours of the cams 628e and 628g, whose transmitter units are connected with the double-acting motor 672 for double-acting drive, will have their contours of substantially complementary form so that when one is rising, the other is falling at a corresponding rate. However, the time phasing of the two cams may be offset somewhat and the relief valve pressure settings may be correlated so as to assure proper pop-off and make-up from and to the liquid column line 640. Thus, cam 628g may be set on the shaft 580 a few degrees in advance of cam 628e so far as their respective rises and falls are concerned. On the other hand, the cam 628g may be positioned so as to lag the cam 628e. In either case, the relief valve for the liquid column 640e will be set at a higher pressure than that for the column 640g.

The double-acting fluid motor 676 is also connected for double-acting drive from cams 628f and 628h. These, for example, may have correlated rise and fall portions such that when one cam follower is rising at a predetermined rate, the other cam follower will be falling at a slightly different rate. Thus, on the left-hand stroke of piston 678, cam 628f may fall somewhat faster than cam 628h rises, thereby assuring that the liquid column 640f is being replenished all during the left-hand stroke, and thus, the full pressure up to the setting of the relief valve for liquid column 640h is available to push piston 678 to the left. Operation of the motors 672 and 676, on their return strokes, is effected in a similar manner and the relationship between the rise of one cam and the fall of another may be arranged in a similar manner to that just described.

It will be understood that each of the liquid column lines 640 and the associated expansible chambers of the transmitter and fluid motor will be maintained filled with solid oil or other power transmitting liquid. For this purpose suitable air bleed valves, not illustrated, are installed at all high points within the closed liquid columns. Thus, with the contours of all of the cams 628 properly chosen, the two-speed transmission will drive the cam shaft 580 to produce the predetermined program of motions of the various fluid motors in coordinated sequence and with the accelerations and velocities desired. Normally, the slow speed part of the cam shaft revolution is utilized for machine motions which require slow feeds and heavy forces, such, for example, as drilling, milling, turning, pressing or other machining operations, while the high speed portion of the cam shaft revolution will be utilized to perform accessory operations, such as the chucking and unchucking work pieces and operating work handling mechanisms for automatically feeding pieces in and out of a machine.

Where alternate operation cycles are required occasionally, such motions may be effected by auxiliary power supplied through motor line 610 under the control of valve 596. Thus, it will be seen that pinion 668 may be operated alternatively by the piston 670 when pressure is admitted to shift it and the piston 666 to the right. When the pressure is relieved, then return oil pressure in the right-hand end of motor 664 will push both pistons 666 and 670 back to the left.

Referring now to FIGURES 14 through 44, the mechanico-hydraulic drive and control system, which has just been described in outline is illustrated in detail. The two-speed transmission 551, FIGURES 14 and 18 through 21, includes a housing 551a having a cover 551b at the top and a change gear cover 551c at the side. A suitable filler plug 551d, an oil level sight glass 551e, and a drain plug 551f may be provided. A belt enclosure 554a is secured to the side of the housing and the cover carries a pivoted motor bracket 550a of usual form overlying the transmission.

Figure 14:
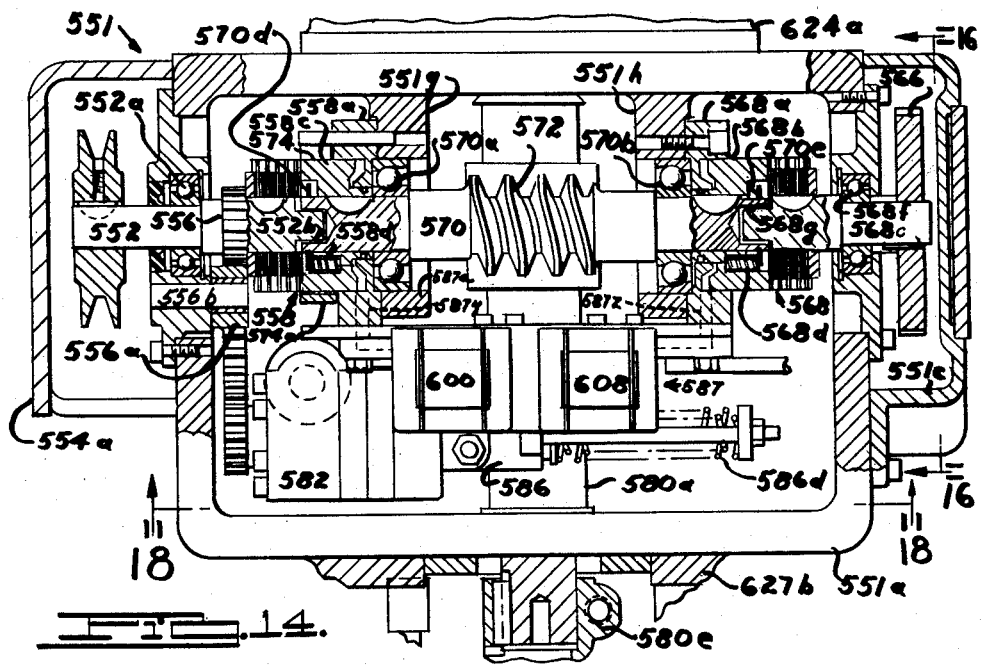
FIGURE 14 is a horizontal sectional view of a two-speed transmission forming part of the device diagrammed in FIGURE 13.
Figure 15:
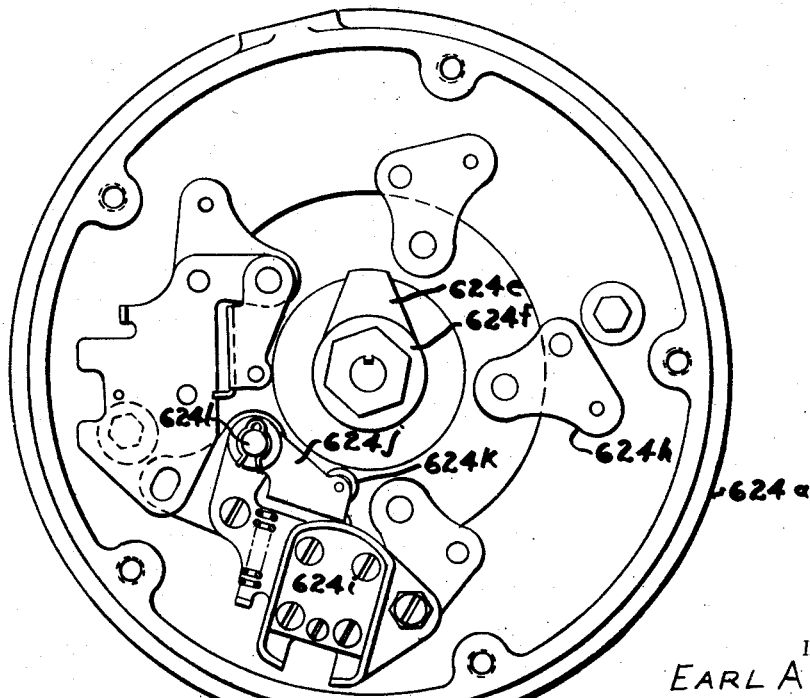
FIGURE 15 is a horizontal sectional view of a cam case associated with the transmission of FIGURE 14.

Projecting from an inside vertical wall of the casing 551a are a pair of vertical bearing brackets 551g and 551h, which support the shaft 570 on bearings 570a and 570b. The bracket 551g also supports the body 558a for the operating cylinder of the high speed clutch 558. A clutch actuating piston 558c is rotatable and slidable in the body 558a and slidably keyed to the shaft 570. Return springs 558d react between a snap ring 570d and piston 558c. The piston 558c at its left-hand end in FIGURE 14 is slotted to receive the tabs of the driven clutch plates and in its mid-portion forms the drum 574 to be engaged by the brake band 574a. The input shaft 552 is journaled in bearings 552a and is piloted at 552b in a bearing in the end of shaft 570. Shaft 552 carries pinion 556 which drives gear 560 through an idler pinion 556a journaled on a stub shaft 556b. The driving plates of clutch 558 are slidably keyed to shaft 552.

The bracket 551h similarly supports the body 568a for the operating cylinder of clutch 568. A piston 568b is rotatable and slidable in the body 568a and has slots receiving the tabs of the driven plates of clutch 568 as well as being slidably keyed to the right-hand end of shaft 570. Similar return springs 568d react against snap ring 570e.

The driving plates of the clutch 568 are slidably keyed to a stub shaft 568c which is journaled in bearings 568b of the housing and in a pilot bearing 568g in the end of shaft 570.

Figure 20:
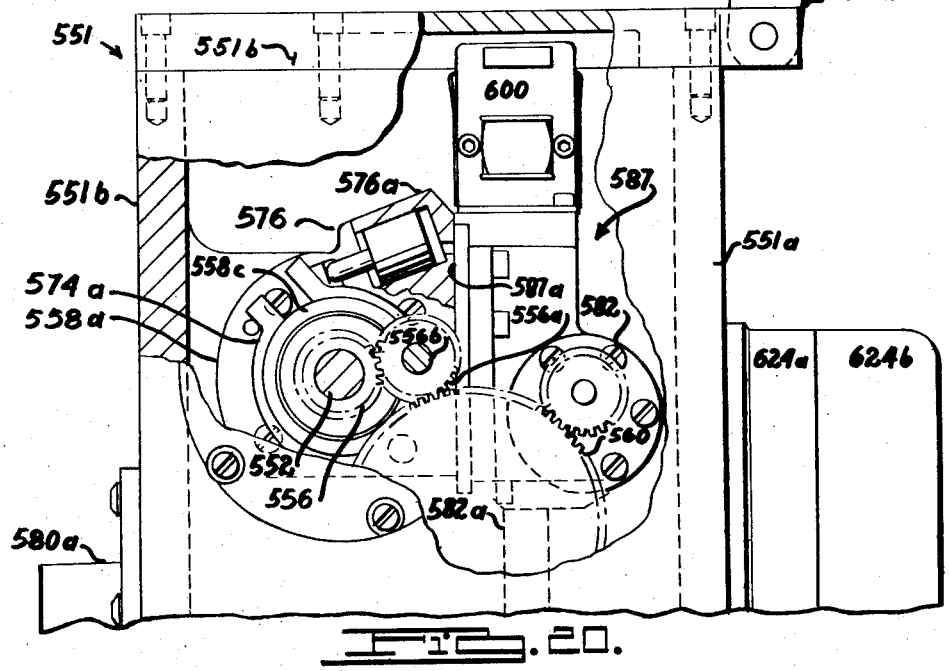
FIGURE 20 is a left end view, partly broken away, showing the mechanism of FIGURE 18.

The control assembly 587 has a flat, vertical face 587a which bolts against corresponding flat surfaces formed on the clutch cylinder bodies 558a and 568a and on the hydraulic brake motor 576a, FIGURE 20. This mounting forms a fluid tight seal so that certain fluid connections between the clutch and brake cylinders and the valve bodies are thereby established. In addition, the control assembly 587 also includes the pump 582 and the accumulator 586, as well as the solenoids 600 and 608, secured to the top part of the valve body. Thus, the entire set of control valves, along with their associated pump, accumulator, and control solenoids, constitutes a self-contained sub-assembly 587 which may be readily removed and replaced as a unit.

The countershaft 562 is journaled in the housing on bearings 562a and 562b and the pinion 564 drives the gear 566 through a compound gear and pinion 564a and 564b journaled on a stub shaft 564c. The pump 582 has an inlet drop pipe 582a provided with a suction filter 582b near the bottom of the housing 551a. An opening 551i provides free connection between the casings 551a and 551c.

The main cam shaft 580 is formed in two sections, section 580a being journaled on bearings 580b in the transmission housing 551a and having similar ends each projecting out of the housing 551a and carrying a keyway for driving either the other section of the cam shaft or the electrical cam mechanism. The transmission 551 is arranged for selective assembly with the main cam box either on the right or the left of the transmission, as viewed in FIGURE 19. The shaft 580a carries keyed thereto a cam collar 580c upon which the adjustable cams 602 and 606 are adjustably mounted by screws 602a and 606a. For this purpose the collar 580c may be provided with a number of screw holes around its circumference and each of the cams 602 and 606 may be provided with a slot for receiving the screw so as to permit circumferential adjustment of the respective cams.

The cam-pulsator unit 627 includes a housing block 627a having an end wall 627b adapted to bolt to the side of the transmission housing to enclose the projecting end of the cam shaft section 580a. At its opposite end, the housing 627a is provided with a bearing plate 627c having a bearing 627d which journals the second section 580d of the cam shaft 580. At its opposite end, the section 580d is formed with a split and keyed socket 580e which is keyed to the end of shaft section 580a and clamped by means of a clamping screw 580f. Access to the clamping screw may be had through a removable filtered breather plug 627i.

The housing block 627a is formed with a longitudinal tubular section which encloses the cam shaft section 580d and the cams 628 carried thereon. Each of the cams engages a longitudinal key 580g and is spaced from the adjacent cams by a spacer tube 580h. The stack of cams and spacer tubes, along with the inner race of bearing 627d, are clamped on the shaft 580d by a nut 580i. A sealing disc 580j and a calibrated index dial 580k are secured to the end of the shaft 580d by a screw 580l.

Opening horizontally out of each side of the housing block 627a are a plurality of cylinder bores 627f, each of which is provided with a removable liner. The liners for the cylinders 627f may be provided with various internal diameters for interchangeable use to provide for changing the displacements of the cylinders as required for various applications. Each of the cylinder bores terminates in a flat surface on the side of the housing block 627a and receives its individual cylinder head 634 secured thereto. Each unit 634 forms a closure for the end of the cylinder, a connection terminal for the liquid column line, a mounting for the balance valve, and a connection to the replenishing reservoir. As shown in FIGURE 22, the liquid column connection is formed in the bottom at 634j. The balance valve assembly is mounted in a vertical bore as shown at 634k and the connection to the reservoir 636 is shown by the passage 634l formed partly in the cylinder head 634 and partly in the housing block 627a.

The replenishing reservoir 636 is preferably formed integrally with the upper part of the housing 627a and includes a cover plate 627g and an oil level sight glass 627h. Suitable filler and drain plugs, not shown, are provided. The cylinder head 634 is also provided with an air bleed valve 634m at the high point in the internal cavity of the cylinder head.

Each of the cylinder bores 627f supports within its liner a piston 632j which has a spherical outer surface at 632k and a packing cup 632l. A piston rod 632m is rigidly secured to the piston and is bifurcated at its opposite end to embrace a follower roller 632n journaled on needle bearings on a wrist pin 632o. The wrist pin is preferably clamped in the ends of the connecting rod and projects outwardly therefrom to form trunnions for the bifurcated ends of a swinging radius arm 632p. Each of the arms 632p is journaled on one of two longitudinal rocker shafts 632q which are carried in upstanding integral ears 632r formed in the lower portion of the housing block 627a. The piston and radius arm assembly, shown in FIGURE 25, carries a large piston 632j, while that shown in FIGURE 26 carries a smaller one for engagement with a smaller liner.

The valve block 587b of the control assembly 587 is shown in FIGURES 28 and 29 and has formed therein a plurality of vertically extending valve bores 590a, 592a, 594a, and 596a, as well as a horizontally extending accumulator bore 586a, having a vertically opening branch port 586b. A laterally extending boss 587c provides a support for the pump 582.

Secured to the vertical face of the body 587b is a subplate 587d which has upon it the mounting face 587a, previously referred to. The block 587b is preferably formed as a casting by the shell molding process and is provided with a number of open-faced, cored recesses which are closed by the sub-plate 587d to provide the various connections between the valves. These cored recesses are indicated at 587e through 587q.

As shown in FIGURE 31, the pump 582 may have a pair of gears 582c and an inlet passage 582d to which the drop pipe 582a is connected. The delivery side of the pump gears opens to passage 587h and has a branch bore 582e opening into the accumulator cylinder 586a.

As shown in FIGURES 32 and 35, the cored passages 587j and 587q extend all the way through the body to the opposite face where they form exhaust ports and, in addition, exhaust passages 587r and 587s in FIGURES 33 and 34, intersect the valve bores 592a and 594a, respectively. In addition, vertical passages 587t, 587u, 587v, and 587w open to the top face of the block 587b to communicate with certain passages in a cover plate and valve assembly 588a shown in FIGURE 30.

The cover plate and valve assembly 588a closes the top ends of the valve bores 590a, 592a, 594a, and 596a. The bottom face of cover plate 588a is provided with grooved passages 588d, 588e, 588f, and 588g connecting the valves and passages as shown. Holes 588h and 588i overlie the valve bores 590a and 596a and receive the operating plungers for their respective solenoids 600 and 608, which are mounted on top of the plate 588a. Bore 588c has vertical connections, shown dotted, with grooves 588g and 588f and with bore 599a but not with groove 588d. Groove 588e vents bore 596a.

The bottom surface of the valve block 587b may be provided with a stop plate 587x, FIGURE 27, overlying, but not sealing the ends of the three vertical valve bores, 590a, 594a, and 596a but sealing around the projecting stem of valve 592. Thus is formed the lower end of holding cylinder 604 diagrammed in FIGURE 13. Cover plate 588a closes the top end of bore 592a to form the upper end of the holding cylinder. The subplate 587d, as shown in FIGURE 36, has an extension of the passage 587e which serves to form a fluid connection with the brake cylinder 576a, FIGURE 20. A hole 587y forms a fluid connection between recess 587f and the high speed clutch cylinder body 558a, FIGURE 14. At its opposite ends, the subplate 587d is provided with holes 587z, the upper one of which connects between recess 587p and a fluid connection terminal, not shown, in the body 568a and forms a part of the auxiliary, hydraulic power line 610, FIGURE 13. The lower hole 587z, FIGURE 36, connects from the recess 587l to the cylinder in slow speed clutch body 568a.

Certain of the exhaust passages in the valve body are provided with openings through the plate 587d as shown at 587j, 587n, and 587q in FIGURE 36. The accumulator 586 is provided with a piston 586c, FIGURE 18, slidable in the bore 586a and urged to the left by a compound spring assembly 586d held in place by the studs 586e and abutment plate 586f. The spill-over port 586b may be connected with a lubricant distributing pipe system 586g for lubricating the various gears and bearings in the transmission and cam box.

Referring now to FIGURE 24, the construction of the balance valve for the liquid columns is there illustrated from which it will be seen that each assembly 634k comprises a sleeve or body 634n which is removably mounted in the cylinder head 634a and receives at its upper end a threaded spring abutment and dashpot member 634o which serves to adjust the tension of a spring 634p for a relief valve 634q. A piston 634r, on the upper end of the relief valve, has a groove on its side and serves as a dashpot member while the valve at its lower end normally closes the opening in the bottom of the body 634k. At its lower end, the valve 634q carries a ball check valve 634s by means of a combined spring and retaining cage indicated at 634t. Thus, whenever the pressure in the liquid column rises above the setting of the relief valve spring 634p, the relief valve 634q will open to permit discharge into reservoir 636. Whenever the pressure in the liquid column falls below the super-atmospheric pressure maintained in reservoir 636, then the check valve 634s will open, allowing replenishment.

The construction of the return oil reservoir 652 and manifold 658 is illustrated in FIGURES 37 and 38 from which it will be seen that the reservoir comprises a closed container in the general form of a cube with rounded corners (or a sphere with flattened sides) having removable top and bottom plates 652a and 652b. One of the sides is provided with a removable connection plate 652c to which the outlet connection 658 is secured as is also the horn structure 660 inside the container. The container is preferably made with thick walls to which mounting brackets and other accessories may be bolted and which may serve to receive mounting bolts for the reservoir itself. For example, a sub plate 652d may be secured to one of the flat walls and the other two flat walls may receive such accessories as air line regulators and filters, as indicated at 652e and f. If desired, a reciprocating air pressure booster 652g may be provided and the connections arranged so that compressed air from a supply line 654 will pass through a regulator to the booster 652g from whence it may enter the upper part of the container 652 through a passageway, not illustrated. The air supply line extends beyond the booster and through another regulator and filter assembly to a line, not illustrated, leading to the reservoir air supply connection 638 of FIGURE 13.

Figure 21:
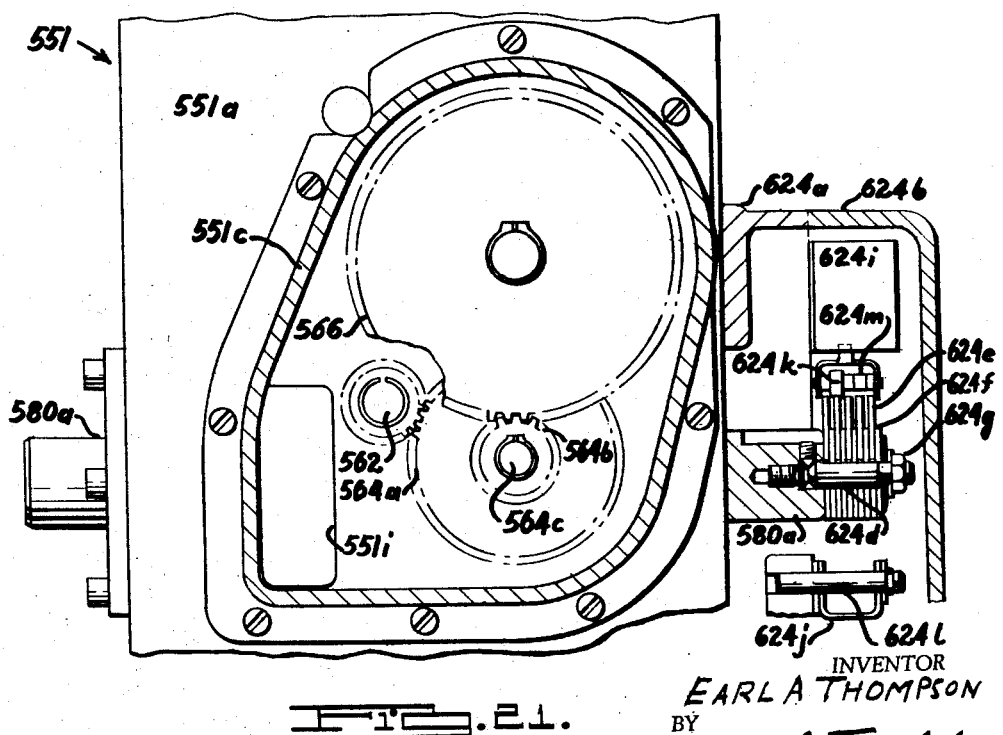
FIGURE 21 is a right end view, partly broken away, showing the mechanism of FIGURE 18.

Referring now to FIGURES 16 and 21, the end of the cam shaft 580a opposite to that which drives the cam-pulsator unit may be utilized for the purpose of providing coordinated electrical timing of the transmission itself and also of other machine devices, if desired. For this purpose a switch case comprising a base member 624a and a cover 624b is secured to the side of the transmission casing 551a. Secured to the end of the shaft 580a is a pin 624d on which a stack of alternate leaf cams 624e and spacer washers 624f is mounted. The pin 624 has a keyway and each of the washers 624f has a tongue engaging that keyway, whereas the leaf cams 624e have round holes and are free to rotate around the pin 624d. A clamping nut 624g serves to clamp the assembly tightly together when the cams have been adjusted in a desired relationship thus preventing relative rotation. The base 624a has a plurality of mounting pads 624h for the reception of switch assemblies 624i. Each of these may include a follower lever 624j having a roller 624k engageable with only one of the cams 624e. The follower levers are pivoted at 624l. Suitable spacer washers 624m may be mounted along side rollers 624k so as to position each roller in alignment with only one of the cams 624e, as shown in FIGURE 21. The switch assemblies 624i may be of any suitable form, having an actuating plunger which may be depressed by the motion of the follower lever 624j.

Referring now to FIGURES 39 through 44, there are illustrated diagrammatically the actions of various possible cam contours and relief valve settings for use with the double-acting drive system to operate the motors 672 and 676 of FIGURE 13. Thus, in FIGURE 39 cam 628e may have a contour shown in solid lines which is angularly displaced in the direction of the arrow to have a slight lead ahead of the imaginary contour shown in dot-dash lines which is exactly complementary to the contour of cam 628g. Tht is to say, the rise of the dotted line contour is equal and opposite to the rise of the cam 628g. The followers 630e and 630g are designated H.P. and L.P., respectively, to indicate that one has a high pressure setting for its relief valve 634 and the other has a lower pressure setting.

Figure 41:
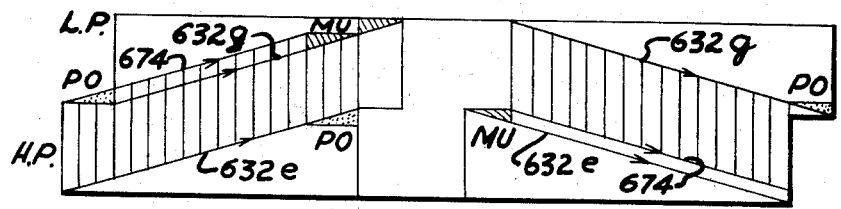
FIGURE 41 is a plot of the action of the cams of FIGURE 39 under one selected operating condition.

In FIGURE 41, the movements of the members are plotted vertically against angular rotation of the cam shaft plotted horizontally. Thus, the displacement of the pulse transmitter 632e commences first and since the liquid column 640e is subject to the high pressure relief valve, the piston 674 will travel concurrently therewith. The low pressure pulse transmitter 632g does not begin to recede, however, at first so that piston 674 will cause pop-off of the relief valve 634g, as shown in the dotted triangle marked PO at the left of FIGURE 41. When a point is reached where cam 628g begins to fall, the three units will travel in synchronism until piston 674 reaches the limit of its stroke. Thereafter the high pressure pulse transmitter 632e will cause pop-off of the relief valve 634e as shown by the dotted triangle marked PO near the middle of FIGURE 41. At the same time, the pulse transmitter 632g will continue its recession, although piston 674 remains stationary, and thus, the displacement required at transmitter 632g will have to come from make-up fluid, as shown in the two cross-hatched triangles at the top center of FIGURE 41.

After the predetermined dwell, the pulse transmitter 632e will start to recede, but there is no cause at first for the piston 674 to start to return. Accordingly, the make-up fluid will enter pulse transmitter 632e as shown in the cross-hatched triangle marked MU at center of FIGURE 41. When cam 628g begins to rise, then transmitter 632g will start to drive piston 674 on its return stroke. When this has been completed the further travel of cam 628g will result in pop-off of relief valve 634g as shown in the dotted triangle at the right of FIGURE 41.

Figure 42:
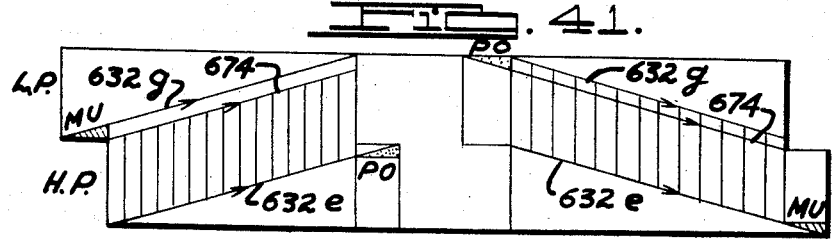
FIGURE 42 is a view corresponding to FIGURE 41, showing another selected operating condition.

Instead of having the lobe of the cam 628e displaced in an advancing direction, it may be displaced in a lagging direction, in which case the motions will be such as are diagrammed in FIGURE 42. The actions there plotted will be self-evident by analogy to the description of FIGURE 41. It will also be understood that the cam contours may be so chosen that the cam 628e, for example, will lead the other cam during its rise and will lag the other cam during its fall. Such action can be easily visualized by transposing the right-hand half of FIGURE 42 with the right-hand half of FIGURE 41. Thus, there are four possible selections which may be utilized to meet particular conditions.

Figures 39, 40:
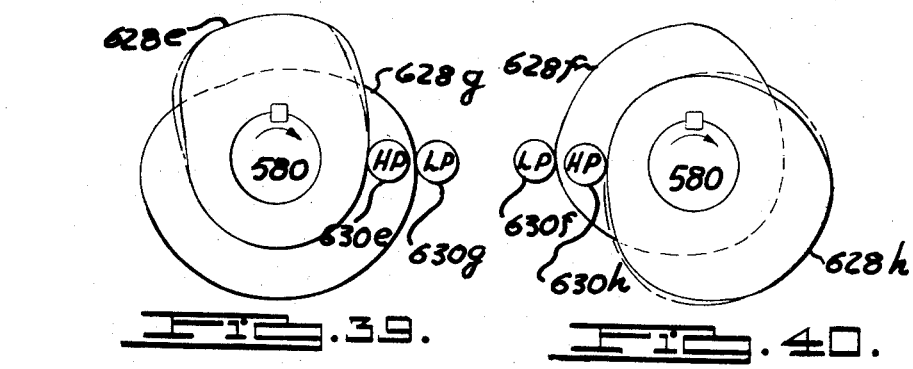
FIGURE 39 is a diagrammatic view of a pair of cams and followers arranged for double acting drive.
FIGURE 40 is a diagrammatic view of another pair of cams and followers arranged for double acting drive.
Figure 43:
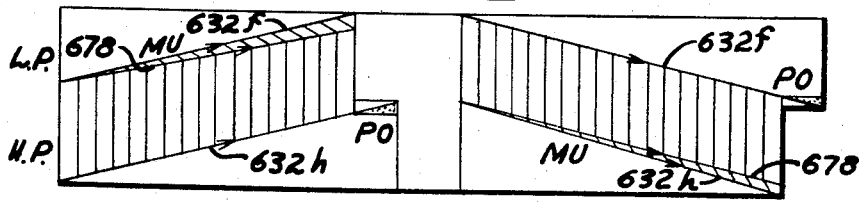
FIGURE 43 is a plot showing the action of the cams of FIGURE 40 under a selected operating condition.
Figure 44:
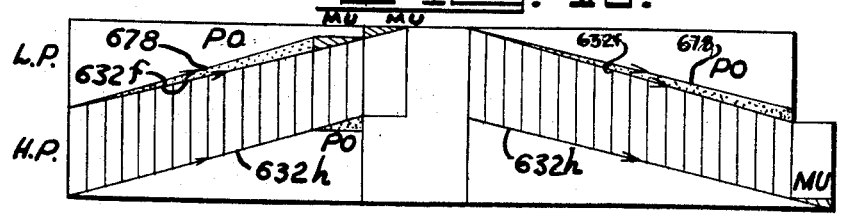
FIGURE 44 is a plot corresponding to FIGURE 43 showing a different selected operating condition.

Instead of having the complementary cam pairs correlated for a predetermined lead or lag, it is possible to select contours in which the follower excursions may commence simultaneously but one may proceed at a higher velocity than the other. Such an arrangement is diagrammed in FIGURE 43 for cams such as illustrated in FIGURE 40 for operating the double-acting motor 676. In this arrangement, the cam 628h operates the follower 630h for the pulse transmitter having the high pressure relief valve setting. The solid line contour of the cam 628h has a slower rise than the theoretical rise shown in dotted lines which would be complementary to the fall of the cam 628f. Thus, the motor piston 678 is driven somewhat slower than the cam follower 630f recedes, causing make-up to occur in the low pressure liquid column, as shown by the cross-hatched, long triangle marked MU at the top of FIGURE 43. When piston 678 completes its movement, pop-off occurs in the pulse transmitter 632h through the high pressure relief valve 634h. On the return stroke the action is as shown at the right of FIGURE 43 with make-up occurring in the liquid column 640h all during the return stroke and with pop-off in the liquid column 640f occurring at the completion of the stroke of piston 678. This type of contour and pressure setting is suitable for operating load devices in which the full power available is determined by the piston area and the pressure setting of the high pressure relief valve alone and in which no substantial additional load resistance is imposed by hydraulic pressure in front of the advancing work piston.

In other applications it may be desired to maintain positively a predetermined pressure in advance of the advancing work piston, in which case the contour of cam 628h may be arranged to rise at a faster rate than cam 628f falls and to fall faster than cam 628f rises. Such conditions are diagrammed in FIGURE 44 from which it will be seen that there is a constant pop-off from the low pressure pulse transmitter 632f all during the advance of the motor piston 678. It will also be clear that as with respect to FIGURES 43 and 44, cam contours may be so chosen that the right-hand halves of the diagrams are in effect transposed with one another.

It will thus be seen that the present invention has provided an improved programming and motion transferring system for actuation of machine elements in which any of a variety of predetermined cycles of motions may be performed in sequence reliably and efficiently.

The invention furthermore provides a system wherein all motions receive both control and power from a cam, and in which the system is maintained under a pre-load or bias from a common accumulator system which assures that all lost motion will be taken up. The biasing system and the replenishing system furthermore are so arranged as to assure positive pressurization of the liquid columns at all times, even during replenishment, and any entrainment of air into the liquid columns is prevented by reason of the quiescent pools of liquid in the two reservoirs under high and low pressure, respectively.

The invention further provides for a multi-section system in which energy may be transferred from one section to another through the return biasing system, thereby minimizing the peak power requirements.

While the two forms of embodiment of the invention as herein disclosed constitute preferred forms, it is to be understood that other forms might be adopted, all coming within the scope of the claims which follow.

What is claimed is as follows:

1. A mechanico-hydraulic power transmission device comprising at least two hydraulic pulse transmitters, means for mechanically driving the transmitters in timed relation, a plurality of hydraulic pulse receivers, closed liquid column conduits, one connecting each transmitter to a receiver, a plurality of hydraulic displacement elements, one mechanically connected to oppose each receiver, a common liquid conduit system connecting the displacement elements together, and an accumulator connected to the conduit system for maintaining a predetermined volume of liquid in said system under pressure, whereby the receivers and transmitters are returned during recession of their respective driving means with negligible energy consumption.

2. A motion transferring device having a plurality of sections each comprising a liquid column having a single-acting transmitter at one end and a double-acting receiver at the other end, coordinated rotary cam means for operating the transmitters according to a predetermined motion program, and one hydraulic pressure accumulator connected to all of the receivers in opposition to the transmitters to form a fixed-volume liquid pressure return motion system, acting both to transfer energy from an advancing section to a returning section as well as to store and return energy from and to a single section.

3. A motion transferring device having a plurality of sections each comprising a liquid column having a single-acting transmitter at one end and a double-acting receiver at the other end, coordinated rotary cam means for operating the transmitters according to a predetermined motion program and means for hydraulically biasing each receiver in the direction of return motion, said means comprising a hydraulic accumulator containing air under pressure, and a manifold connecting each receiver to each other receiver and to the accumulator and comprising a duct having a fluid volume intermediate the accumulator and the nearest receiver which is greater than the volumetric displacement of the receiver whereby air-contaminated liquid is kept away from the receivers.

4. A motion transferring device having a plurality of sections each comprising a liquid column having a single-acting transmitter at one end and a double-acting receiver at the other end, coordinated rotary cam means for operating the transmitters according to a predetermined motion program, a single hydraulic pressure accumulator connected to all of the receivers in opposition to the transmitters to form a fixed-volume liquid pressure return motion system, and one separate reservoir for replenishing liquid associated with the transmitters, whereby both ends of each section are protected against air entrance by a body of quiescent liquid.

5. A hydraulic system for imparting alternating motion to a machine part comprising in combination a double-acting hydraulic motor, a cam operated pulsator pump connected by a liquid column to one side of the motor and having a displacement greater than that of the motor, whereby only a portion of each pulsation is effective to operate the motor and another portion results in a positive but non-effective fluid displacement out of the column, and another portion results in a negative but non-effective fluid displacement into the column, a first reservoir for pressure liquid operatively connected with the column for accepting and offering fluid during the non-effective displacements, and a second reservoir for higher pressure liquid connected to the opposite side of said motor, whereby each terminus of the liquid column is subject to the air-separating and air-excluding action of said reservoirs.

6. A hydraulic system for imparting alternating motion to a machine part comprising in combination a double-acting hydraulic motor, a cam operated pulsator pump connected by a liquid column to one side of the motor and having a displacement greater than that of the motor, whereby only a portion of each pulsation is effective to operate the motor and another portion results in a positive but non-effective fluid displacement out of the column, and another portion results in a negative but non-effective fluid displacement into the column, and a reservoir including a body of quiescent liquid at a small head relative to the pump forming a source of air-free replenishing liquid.

7. A motion transferring device comprising a liquid column having a single-acting transmitter at one end and a double-acting receiver at the other end, rotary cam means for operating the transmitter according to a predetermined motion program, a hydraulic pressure accumulator connected to the receiver in opposition to the transmitter to form a fixed-volume liquid pressure return motion system, and means for driving the cam means at a plurality of speeds during different portions of the motion program.

8. In combination a support, a member movable on said support and means for moving said member on said support in a controlled manner comprising a rotatable cam, means for rotating the cam at more than one rate of speed during a single revolution, a cam follower engaging said cam and movable in response to rotation of said cam, a piston operatively connected with said cam follower, a cylinder in which said piston is operable and a hydraulic motor arranged when actuated to move said member, and means forming a normally closed liquid column between said cylinder and said hydraulic motor, whereby the hydraulic fluid displaced by said piston is caused to flow to said motor to actuate said movable member at a rate corresponding to the rate of displacement of said piston as controlled by the shape and speed of said cam, a hydraulic pressure reservoir and a liquid conduit between the reservoir and the motor to apply pressure to the motor and to the piston to maintain the follower in contact with the cam as the fall of the cam passes beneath the follower.

9. A hydromechanical apparatus for driving a machine element, such as a machine tool slide, through a cycle of forward and return motion comprising a rotary cycle cam, means for driving the cam, a cam follower operated by the cam, a hydraulic displacement element operated by the follower, a second hydraulic displacement element connected to the machine element for actuation thereof, a normally closed liquid column connecting the displacement elements, positive stop means limiting every stroke of one displacement device so as to have a smaller displacement than the other, a relief valve for relieving fluid from the column at one end of the stroke, a replenishing check valve for restoring make-up fluid to the column at the opposite end of the stroke, means forming a supply of make-up fluid under superatmospheric pressure connected with the replenishing valve, a third hydraulic displacement element opposing the second one, and means forming a plenary volume liquid pressure source connected to the third displacement element.

10. A hydromechanical apparatus for driving a plurality of machine elements, such as machine tool slides, through coordinated cycles of forward and return motion comprising a plurality of cams, one of each machine element, means for driving the cams in synchronism, cam followers, one operated by each cam, a first series of hydraulic displacement elements, one operated by each follower, a second series of displacement elements, each connected to actuate a machine element, a normally closed liquid column separately connecting each set of displacement elements, a third series of displacement elements, each connected to a machine element for actuation thereof in a direction opposed to the second displacement element, and a common source of fluid under pressure connected in parallel to the third displacement elements and containing therewith a predetermined volume of liquid for biasing the machine elements against the cam-operated motion and for driving the machine elements in the opposite direction under the control of its respective cam.

11. A hydromechanical apparatus for driving a plurality of machine elements, such as machines tool slides, through coordinated cycles of forward and return motion comprising a plurality of cams, one for each machine element, means for driving the cams in synchronism, cam followers, one operated by each cam, a first series of hydraulic displacement elements, one operated by each follower, a second series of displacement elements, each connected to actuate a machine element, a normally closed liquid column separately connecting each set of displacement elements, a third series of displacement elements, each connected to a machine element for actuation thereof in a direction opposed to the second displacement element, liquid pressure means positively biasing the machine elements in a direction opposing cam operated motion, and a separate source of liquid under a lower pressure connected to each liquid column by individual balancing means to replenish liquid lost therefrom.

12. In combination, a two-speed power transmission, a shaft driven thereby, means for automatically causing the driven shaft to be rotated a predetermined portion of each revolution at one speed and another portion of each revolution at the other of said speeds, a cam mounted on said driven shaft to rotate therewith, a power cylinder associated with said cam, a power piston disposed in said power cylinder and operably associated with said cam so as to be displaced through a power stroke in said cylinder by rotation of the cam, a work performing piston and cylinder assembly, a conduit connecting the power cylinder with one end of said work performing cylinder and forming a closed liquid column between said power piston and said work performing piston, a relatively incompressible fluid completely filling said liquid column whereby when said power piston is moved through said power stroke, said work piston is moved through its work stroke, means acting to positively limit the stroke of said work performing piston in both directions so that its displacement is slightly less than the displacement of the power piston in said power cylinder, a reservoir containing a supply of said fluid, means interposed between said reservoir and said liquid column for balancing the quantity of fluid in said liquid column as required and means for effecting the return stroke of said work performing piston.

13. In combination, a two-speed power transmission, a shaft driven thereby, means for automatically causing the driven shaft to be rotated a predetermined portion of each revolution at one speed and another portion of each revolution at the other of said speeds, a plurality of cams mounted on said driven shaft to rotate therewith, a power cylinder associated each cam, a power piston disposed in each power cylinder and operably associated with one of said cams so as to be displaced through a power stroke in said cylinder by rotation of the associated cam, a plurality of work performing piston and cylinder assemblies, one for each power cylinder, conduits connecting the power cylinders with one end of the work performing cylinders and forming a closed liquid column between each power piston and the associated work performing piston, a relatively incompressible fluid completely filling each of said liquid columns, means acting to positively limit the stroke of the work performing pistons in both directions so that the displacement of each is slightly less than the displacement of the associated cam actuated power piston in its power cylinder, a reservoir containing a supply of said fluid, means interposed between said reservoir and each of said liquid columns for balancing the quantity of fluid in said liquid columns as required, means for effecting the return stroke of said work performing pistons, each of said cams having a lobe thereon for causing displacement of the associated power piston through its power stroke, the lobe on one of said cams being positioned to effect displacement of its associated power piston only during that portion of each revolution when the driven shaft is rotating at one of said two speeds and the lobe of another of said cams being positioned to effect displacement of its associated power piston during both said portions of each revolution of said shaft, the lobe of a third cam being positioned to effect displacement of its associated power piston only when said driven shaft is rotating at the other of said two speeds, including means for adjusting the point of transition in the cycle of rotation of the shaft from one speed to the other.

14. A hydromechanical apparatus for directly driving a machine element, such as a machine tool slide, through a cycle of forward movement against a bias and return movement with the bias, comprising a rotary cycle cam having a rapid rise portion, a slower rise portion, and a receding portion, means for driving the cam at more than one rate of speed, a cam follower operated by the cam, a hydraulic displacement element operated by the follower through a cycle determined by the shape and the speed of the cam, a second hydraulic displacement element directly connected to actuate the machine element, a normally closed liquid column between the displacement elements, and means operated synchronously with the cam for controlling the speed of the cam whereby the machine element is advanced at a rapid rate while the cam is driven at a high speed with the rapid rise portion engaging the follower, is advanced at a slower rate while the cam is driven at a slower speed with the slower rise portion engaging the follower and is returned at a rate controlled by the receding portion of the cam.

15. A hydromechanical apparatus for driving a machine element, such as a machine tool slide, through a cycle of forward and return motion comprising a rotary cycle cam, means for driving the cam, a cam follower operated by the cam, a hydraulic displacement element operated by the follower, a hydraulic displacement element having a slightly smaller displacement and connected to the machine element for actuation thereof, a normally closed liquid column connecting the displacement elements, liquid pressure means positively biasing the machine element in a direction opposing cam-operated motion, and a separate source of liquid under a lower pressure connected to the liquid column by a balancing means to replenish liquid lost therefrom.

16. A hydromechanical apparatus for driving a machine element, such as a machine tool slide, through a cycle of forward and return motion comprising a rotary cycle cam, means for driving the cam, a cam follower operated by the cam, a hydraulic displacement element operated by the follower, a hydraulic displacement element connected to the machine element for actuation thereof, a normally closed liquid column connecting the displacement elements, liquid pressure means positively biasing the machine element in a direction opposing cam-operated motion, and a separate source of liquid under a lower pressure connected to the liquid column by a balancing means to replenish liquid lost therefrom, said two displacement elements and said balancing means constituting the sole paths for flow into or out of the liquid column.

17. A hydromechanical apparatus for driving a plurality of machine elements, such as machine tool slides, through coordinated cycles of forward and return motion comprising a plurality of cams, one for each machine element, means for driving the cams in synchronism, cam followers, one operated by each cam, a first series of hydraulic displacement elements, one operated by each follower, a second series of displacement elements, each connected to actuate a machine element, a normally closed liquid column separately connecting each set of displacement elements, a third series of displacement elements, each connected to a machine element for actuation thereof in a direction opposed to the second displacement element, and liquid pressure means positively biasing the machine elements in a direction opposing cam operated motion, said two displacement elements partaking of concurrent motion transferred from one to the other by the liquid column throughout substantially the complete stroke of each.

18. A motion programming and transmitting system comprising a camshaft, means constituting the principal source of power in the system and arranged to drive the camshaft, a first set of power cams on the camshaft, liquid column type motion transfer devices operated by the first set of cams, a second cam means on the shaft, and means controlled by the second cam means for interrupting the drive of the camshaft.

19. A motion programming and transmitting system comprising a camshaft, means constituting the principal source of power in the system and arranged to drive the camshaft, a first set of power cams on the camshaft, liquid column type motion transfer devices operated by the first set of cams, a second cam means on the shaft, and a plural speed transmission mechanism connected between the power source and the camshaft and having a control element in operative relation to the second cam means.

20. A motion programming and transmitting system comprising a camshaft, means constituting the principal source of power in the system and arranged to drive the camshaft, a first set of power cams on the camshaft, liquid column type motion transfer devices operated by the first set of cams, a second cam means on the shaft, a two-speed gear box between the power source and the camshaft, hydraulic means for changing the gear box speed, and a valve controlled by the second cam means for controlling the speed changing means.

21. A motion programming and transmitting system comprising a camshaft, means constituting the principal source of power in the system and arranged to drive the camshaft, a first set of power cams on the camshaft liquid column type motion transfer devices operated by the first set of cams, control means for initiating rotation of the camshaft and a second control means operated from the camshaft for maintaining the camshaft in operation until a predetermined stopping position is reached.

22. A motion programming and transmitting system comprising a camshaft, means constituting the principal source of power in the system and arranged to drive the camshaft, a set of power cams on the camshaft, liquid column type motion transfer devices operated by the first set of cams, an electrically operated translating device operable independently of the power cams, a switch for controlling said last device and other cam means on the camshaft for operating the switch at predetermined angular positions of the camshaft.

23. A motion programming and transmitting system comprising a camshaft, means constituting the principal source of power in the system arranged to drive the camshaft, clutch means interposed between the power means and the camshaft, a set of power cams on the camshaft, liquid column type motion transfer devices operated by the set of cams, valve means shiftable between alternate positions, fluid control means connected to operate the clutch means and other cam means on the camshaft for operating the valve means at predetermined angular positions of the camshaft.

24. A motion programming and transmitting system comprising a camshaft, means constituting the principal source of power in the system and arranged to drive the camshaft, a set of power cams on the camshaft, liquid column type motion transfer devices operated by the first set of cams, valve means shiftable between two positions, hydraulic means for controlling shifting of the valve means, a second valve for controlling said hydraulic means and other cam means on the camshaft for controlling the second valve.

25. A motion programming and transmitting system comprising a camshaft, a prime mover connected to operate the camshaft, a plurality of programming and driving cams in fixed relation on the camshaft, a plurality of liquid column type motion transfer devices, one operated by each cam, a plurality of driven elements each operated by a transfer device, means for stopping and starting the camshaft, an auxiliary power source operable while the camshaft is stationary, means for supplying power from the source to operate one of the driven elements and additional cam means on the camshaft for preventing such supply of power during rotation of the camshaft.

26. In combination, a power unit including a driving shaft and a driven shaft, hydraulically actuated means for coupling said shafts, a work element movable through a predetermined stroke, hydraulic means actuated by rotation of said driven shaft to move said work element through said stroke, a source of fluid under pressure, a valve for controlling the admission of pressure fluid from said source to said hydraulically actuated means and means for moving said work element through said stroke while said driven shaft is stationary comprising an auxiliary hydraulic unit for operating said work element, a second valve for directing pressure fluid from said source to said auxiliary hydraulic unit and means for actuating said two valves so that said hydraulically actuated means is rendered inoperative and pressure fluid is directed from said source to said auxiliary hydraulic unit.

27. A motion programming and transmitting system comprising a camshaft, a prime mover connected to operate the camshaft, a plurality of programming and driving cams in fixed relation on the camshaft, a plurality of liquid column type motion transfer devices, one operated by each cam, a plurality of driven elements each operated by a transfer device, a clutch for controlling transmission of power from said prime mover, and cam means on the camshaft for controlling the clutch in accordance with the angular position of the camshaft.

28. A motion programming and transmitting system comprising a camshaft, a prime mover connected to operate the camshaft, a plurality of programming and driving cams in fixed relation on the camshaft, a plurality of liquid column type motion transfer devices, one operated by each cam, a plurality of driven elements each operated by a transfer device, a brake connected to stop rotation of the camshaft, and cam means on the camshaft for controlling the application and release of the brake.

29. A motion programming and transmitting system comprising a camshaft, a prime mover connected to operate the camshaft, a plurality of programming and driving cams in fixed relation on the camshaft, a plurality of liquid column type motion transfer devices, one operated by each cam, a plurality of driven elements each operated by a transfer device, a speed changing device between the prime mover and the camshaft, a first valve shiftable between two positions to change the camshaft speed, a first valve cam arranged to shift the valve at a predetermined position of the camshaft, hydraulic holding means responsive to cam operation of the valve for holding the valve in its shifted position, a second valve shiftable to release the hydraulic holding means, and a second valve cam arranged to shift the second valve at another predetermined angular position of the camshaft.

30. A motion programming and transmitting system comprising a camshaft, a prime mover connected to operate the camshaft, a plurality of programming and driving cams in fixed relation on the camshaft, a plurality of liquid column type motion transfer devices, one operated by each cam, a plurality of driven elements each operated by a transfer device, a speed changing device between the prime mover and the camshaft, shiftable means for changing the camshaft speed, a first speed change cam for operating the shiftable means, means for holding the shiftable means in shifted position, and a second speed change cam for releasing the holding means.

31. A mechanico-hydraulic power transmission device comprising a rotary camshaft, a first cam on the shaft having a predetermined pattern of rise and fall, a first liquid column type motion transfer device in operative relation to the first cam, a driven element in operative relation to the motion transfer device, a second liquid column type motion transfer device in opposed operative relation to the driven element, a second cam on the shaft having a rise and fall pattern substantially complementary to that of the first cam, volume balancing means for each liquid column effective to relieve liquid in response to pressure developed in the column and effective to replenish liquid whenever the pressure in the column falls below a predetermined minimum, the pattern of the second cam having a fall which slightly lags the rise of the first cam and the second column having a balancing means set to relieve at a lower pressure than the first column, whereby a continuous biasing force is exerted during the rise of the first cam independently of the load resistance of the driven element.

32. A mechanico-hydraulic power transmission device comprising a rotary camshaft, a first cam on the shaft having a predetermined pattern of rise and fall, a first liquid column type motion transfer device in operative relation to the first cam, a driven element in operative relation to the motion transfer device, a second liquid column type motion transfer device in opposed operative relation to the driven element, a second cam on the shaft having a rise and fall pattern substantially complementary to that of the first cam, volume balancing means for each liquid column effective to relieve liquid in response to pressure developed in the column and effective to replenish liquid whenever the pressure in the column falls below a predetermined minimum, and means for limiting the effective liquid displacement at the driven ends of the columns to a smaller value than that at their respective cam ends.

33. A mechanico-hydraulic power transmission device comprising a rotary camshaft, a first cam on the shaft having a predetermined pattern of rise and fall, a first liquid column type motion transfer device in operative relation to the first cam, a driven element in operative relation to the motion transfer device, a second liquid column type motion transfer device in opposed operative relation to the driven element, a second cam on the shaft having a rise and fall pattern substantially complementary to that of the first cam, volume balancing means for each liquid column effective to relieve liquid in response to pressure developed in the column and effective to replenish liquid whenever the pressure in the column falls below a predetermined minimum, the pattern of the second cam having a fall which slightly leads the rise of the first cam, and the second column having a balancing means set to relieve at a lower pressure than the first column, whereby the pressure in the first column is substantially equal to that imposed by the load resistance of the driven element alone.

34. A motion programming and transmitting system comprising a camshaft, a prime mover connected to operate the camshaft, a plurality of programming and driving cams in fixed relation on the camshaft, a plurality of liquid column type motion transfer devices, one operated by each cam, a camcase having opposed ends, a drive shaft positioned for rotation adjacent one end, and a removable cover having a camshaft bearing at the other end, said camshaft being journaled in said bearing at one end and removably coupled to the shaft at the other end, whereby the cams and camshaft may be readily removed and replaced as a unit.

35. A motion programming and transmitting system comprising a camshaft, a prime mover connected to operate the camshaft, a plurality of programming and driving cams in fixed relation on the camshaft, a plurality of liquid column type motion transfer devices, one operated by each cam, a camcase enclosing the camshaft and having a plurality of stationary cylinders in radial spaced relation to the cams, pistons reciprocable in the cylinders, roller cam followers carried by the piston, each in engagement with a cam, and means including a radius arm pivoted in the camcase for preventing rotation of each piston and follower about the cylinder axis.

36. A motion programming and transmitting system comprising a camshaft, a prime mover connected to operate the camshaft, a plurality of programming and driving cams in fixed relation on the camshaft, a plurality of liquid column type motion transfer devices, one operated by each cam, and including a stationary cylinder in alignment with its respective cam, a radius arm stationarily pivoted on an axis parallel to the camshaft, a piston having a spherical surface engaging the cylinder and a rod rigidly secured thereto, a roller cam follower, and a common pintle connecting together the free ends of the radius arm and the piston rod as well as providing an axle for the follower.

37. A motion programming and transmitting mechanism comprising a multi-speed gear box having opposed end walls with an output shaft extending therebetween and exposed for coupling purposes at both said ends, a camcase having a camshaft rotatable therein and carrying a plurality of liquid column type motion transfer devices in operative relation to the camshaft, and means for mounting said camcase upon either end wall of the gear box, said camshaft having a coupling engageable with either end of the output shaft.

38. A motion programming and transmitting mechanism comprising a multi-speed gear box having opposed end walls with an output shaft extending therebetween and exposed for coupling purposes at both said ends, a camcase having a camshaft rotatable therein and carrying a plurality of liquid column type motion transfer devices in operative relation to the camshaft, means for mounting said camcase upon either end wall of the gear box, said camshaft having a coupling engageable with either end of the output shaft, and an electric controller including a second camshaft and a switch housing said controller selectively mountable upon either end wall of the gear box.

39. A motion transferring device comprising a liquid column having a single-acting transmitter at one end and a double-acting receiver at the other end, rotary cam means for operating the transmitter according to a predetermined motion program, a hydraulic pressure accumulator connected to the receiver in opposition to the transmitter to form a fixed-volume liquid pressure return motion system, and an enlarged conduit between the accumulator and the receiver capable of holding a quantity of fluid greater than that in the accumulator.

40. A motion transferring device having a plurality of sections each comprising a liquid column having a single-acting transmitter at one end and a double-acting receiver at the other end, coordinated rotary cam means for operating the transmitters according to a predetermined motion program, a gas and liquid container forming a pressure accumulator and a connecting conduit having a downwardly opening bell mouth near the bottom of the container and an extended portion containing a volume greater than the volume of liquid in the container and communicating with the receivers for producing return motion.

41. A hydro-mechanical apparatus for driving a machine element in two stages of forward motion and return comprising power driven rotary cam means including a pair of cam followers, a first hydraulic displacement element operated by one follower, a second hydraulic displacement element operated by the other follower, a hydraulic displacement motor element connected to the machine element for actuation thereof and connected to the first element by a closed liquid column, an intensifier associated with the motor element and connected to the second element by a second closed liquid column and means for returning the motor and intensifier in the opposite direction to their cam-operated movements.

42. A motion programming and transmitting system comprising a camshaft, a prime mover connected to operate the camshaft, a plurality of programming and driving cams in fixed relation to the camshaft, a plurality of liquid column type motion transfer devices, one operated by each cam, a plurality of driven elements each operated by a transfer device, and a hydraulic intensifier hydraulically connected to one of the transfer devices.

References Cited in the file of this patent

UNITED STATES PATENTS

| | | |
|---|---|---|
| Re. 15,578 | Harley | Apr. 17, 1923 |
| 1,062,580 | Bollee | May 27, 1913 |

(Other references on following page)

UNITED STATES PATENTS

| | | |
|---|---|---|
| 1,062,843 | Murauer | May 27, 1913 |
| 1,662,164 | Pratt | Mar. 13, 1928 |
| 1,663,513 | Howse | Mar. 20, 1928 |
| 1,709,439 | Morris | Apr. 16, 1929 |
| 1,917,507 | Demkier et al. | July 11, 1929 |
| 1,965,517 | Vitalini | July 3, 1934 |
| 1,985,447 | Grubbs | Dec. 25, 1934 |
| 2,092,721 | Arter | Sept. 7, 1937 |
| 2,333,304 | Ernst et al. | Nov. 2, 1943 |
| 2,429,390 | Case | Oct. 21, 1947 |
| 2,526,388 | Miller | Oct. 17, 1950 |
| 2,595,775 | Wrangell | May 6, 1952 |
| 2,597,050 | Audemar | May 20, 1952 |
| 2,607,196 | May | Aug. 19, 1952 |
| 2,612,786 | Schmitter | Oct. 7, 1952 |
| 2,622,372 | Moulden | Dec. 23, 1952 |
| 2,667,146 | Wheeler | Jan. 26, 1954 |
| 2,720,130 | Chang | Oct. 11, 1955 |
| 2,725,776 | Hopkins | Dec. 6, 1955 |
| 2,752,799 | Foltz | July 3, 1956 |
| 2,755,679 | Nallinger | July 24, 1956 |
| 2,891,383 | Troche et al. | June 23, 1959 |
| 2,912,826 | Tan | Nov. 17, 1959 |
| 2,915,016 | Weaver et al. | Dec. 1, 1959 |

FOREIGN PATENTS

| | | |
|---|---|---|
| 966,400 | France | Mar. 1, 1950 |
| 132,107 | Switzerland | June 1, 1929 |